(12) United States Patent
Kato et al.

(10) Patent No.: US 11,938,429 B2
(45) Date of Patent: Mar. 26, 2024

(54) FILTER DEVICE AND METHOD OF MANUFACTURING THE FILTER DEVICE

(71) Applicant: KYOSAN DENKI CO., LTD., Koga (JP)

(72) Inventors: Takafumi Kato, Koga (JP); Toshiaki Agui, Koga (JP); Toshiyuki Yonemoto, Kariya (JP)

(73) Assignee: KYOSAN DENKI CO., LTD., Koga (JP)

(*) Notice: Subject to any disclaimer, the term of this patent is extended or adjusted under 35 U.S.C. 154(b) by 226 days.

(21) Appl. No.: 17/411,190

(22) Filed: Aug. 25, 2021

(65) Prior Publication Data

US 2021/0379516 A1    Dec. 9, 2021

Related U.S. Application Data

(63) Continuation of application No. PCT/JP2020/011402, filed on Mar. 16, 2020.

(30) Foreign Application Priority Data

Mar. 20, 2019 (JP) .................................. 2019-052934

(51) Int. Cl.
*B01D 36/00* (2006.01)
*B01D 17/04* (2006.01)
*B01D 29/00* (2006.01)
*B01D 35/027* (2006.01)
*B01D 35/30* (2006.01)
*F02M 37/24* (2019.01)

(52) U.S. Cl.
CPC ......... *B01D 36/005* (2013.01); *B01D 17/045* (2013.01); *B01D 29/0093* (2013.01); *B01D 35/027* (2013.01); *B01D 35/306* (2013.01); *B01D 2201/0423* (2013.01); *F02M 37/24* (2019.01)

(58) Field of Classification Search
CPC .......................... B01D 36/005; B01D 17/045; B01D 29/0093; B01D 35/027; B01D 35/306; B01D 2201/0423; B01D 17/10; B01D 17/12; B01D 29/21; B01D 29/232; B01D 29/58; B01D 29/90; B01D 29/96; B01D 36/003; B01D 2201/291; B01D 2201/4053; B01D 2201/4076; F02M 37/24; F02M 37/42
See application file for complete search history.

(56) References Cited

FOREIGN PATENT DOCUMENTS

WO   WO-2017110542 A1   6/2017
WO   WO-2018008327 A1 * 1/2018   ............. F02M 37/22

* cited by examiner

*Primary Examiner* — Waqaas Ali
(74) *Attorney, Agent, or Firm* — Harness, Dickey & Pierce, P.L.C.

(57) ABSTRACT

The filter device includes a case, an element, and a water separator. The case accommodates the element and the water separator. The element removes solid particulates from the fuel. The element can be replaced by opening the case. The water separator removes water content from the fuel. The water separator is held in the case. The water separator is movable relative to the case. The water separator is movable within a movable range. The element and the water separator are provided with a passage connecting member for connecting a fuel passages.

3 Claims, 24 Drawing Sheets

FILTER DEVICE AND METHOD OF MANUFACTURING THE FILTER DEVICE

CROSS REFERENCE TO RELATED APPLICATION

The present application is a continuation application of International Patent Application No. PCT/JP2020/011402 filed on Mar. 16, 2020, which designated the U.S. and claims the benefit of priority from Japanese Patent Application No. 2019-52934 filed in Japan filed on Mar. 20, 2019, the entire disclosure of the above application is incorporated herein by reference.

TECHNICAL FIELD

The disclosure herein relates to a filter device and a method of manufacturing the filter device.

BACKGROUND

A filter device is required to remove solid particles by using an element. In addition, some application of the filter device is required to separate and remove water particles.

SUMMARY

A water separator and a solid removal element may be often integrated and replaced at the same time. In view of the above or other points not mentioned, further improvements are needed in a filter element and a filter device.

A filter device disclosed herein, comprising: a case which provides a fluid passage; an element which is accommodated in the case and filters fluid; a water separator which is accommodated in the case and separates water from the fluid; passage connecting members which form a fluid passage between the element and the water separator, and separably connect the element and the water separator; a holding member which holds the water separator with respect to the case while making the water separator movable with respect to the case; and a support member which movably supports the element by a movable distance in the radial direction, wherein a movable distance of the water separator in the radial direction is set to be larger than the movable distance of the element.

A filter device disclosed herein, comprising: a case which provides a fluid passage; an element which is accommodated in the case and filters fluid; a water separator which is accommodated in the case and separates water from the fluid; passage connecting members which form a fluid passage between the element and the water separator, and separably connect the element and the water separator; and a holding member which holds the water separator with respect to the case while making the water separator movable with respect to the case, wherein the holding member has a positioning surface which guides a central axis of the water separator toward a central axis of the case by coming into contact with the water separator.

According to the disclosed filter device, the water separator is held in the case. The element and the water separator are separably connected by passage connecting members. The water separator is movable within a movable range with respect to the case. Therefore, the passage connecting members can form a fluid passage while allowing the water separator to move within the movable range. As a result, the element can be replaced.

A method of manufacturing a filter device disclosed herein, comprising: preparing a first case and a second case to form a case which provides a fluid passage; preparing an element which is capable of being accommodated in the case and filters a fluid; preparing a water separator which is capable of being accommodated in the case and separates water from the fluid; holding the water separator with respect to the second case; connecting the element and the water separator in a separable manner so as to form the fluid passage between the element and the water separator; moving the water separator with respect to the second case in a movable range; and closing a case by connecting the first case and the second case, wherein the moving moves the water separator along a positioning surface provided by the case in a sliding manner.

According to the disclosed method of manufacturing the filter device, the water separator is held in the case. The element and the water separator are separably connected. The water separator moves within a movable range with respect to the case. Therefore, it is possible to form a fluid passage while allowing the water separator to move within the movable range. As a result, the element can be replaced.

The disclosed aspects in this specification adopt different technical solutions from each other in order to achieve their respective objectives. Reference numerals in parentheses described in claims and this section exemplarily show corresponding relationships with parts of embodiments to be described later and are not intended to limit technical scopes. The objects, features, and advantages disclosed in this specification will become apparent by referring to following detailed descriptions and accompanying drawings.

BRIEF DESCRIPTION OF DRAWINGS

The disclosure is further described with reference to the accompanying drawings in which.

DESCRIPTION OF EMBODIMENT

Figure 1:
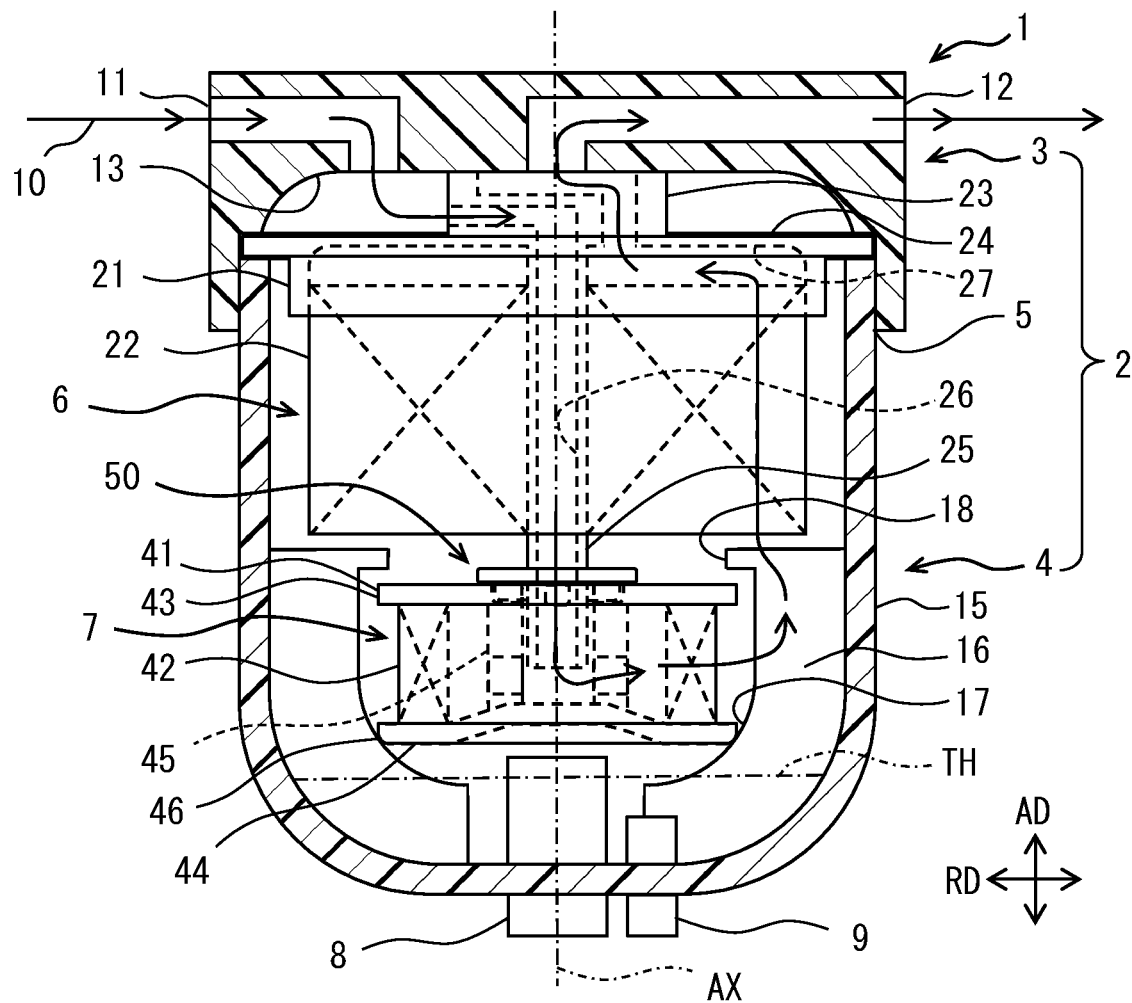
FIG. 1 is a cross-sectional view showing a filter device of a first embodiment.

Several embodiments are described with reference to the drawings. In some embodiments, parts which are functionally and/or structurally corresponding and/or associated are given the same reference numerals, or reference numerals with different hundreds digit or higher digits. For corresponding parts and/or associated parts, reference can be made to the description of other embodiments.

First Embodiment

In FIG. 1, a filter device 1 removes foreign substance contained in fluid by filtering the fluid. The filter device 1 removes water as a foreign substance and solid fine particles as a foreign substance. The fluid to be filtered is a variety of liquids or gases such as fuel, water, oil and air.

In this embodiment, the fluid is a fuel. The filter device 1 provides a fuel filter device which filters the fuel supplied to the fuel consumption device. The filter device 1 is provided in a passage 10 provided by a fuel supply device which supplies fuel from a fuel tank to the fuel consumption device. In a typical example, the fuel consumption device is an internal combustion engine including a diesel engine or a gasoline engine. The filter device 1 is attached to a fuel consumption device or a device equipped with the fuel consumption device. The device includes vehicles, ships, aircraft, amusement equipment, simulation equipment and the like. The device includes mobile equipment and stationary equipment. In a typical example, the filter device 1 is fixed to a body of the vehicle. In a typical example, the fuel is a diesel fuel, or a liquid fuel containing gasoline. Usually, the diesel fuel often contains water. The filter device 1 captures and separates solid fine particles. Further, the filter device 1 captures, coalesces, and separates minute water content.

The filter device 1 has a central axis AX. The filter device 1 is fixed so that an axial direction AD is aligned in a vertical direction in order to separate the fuel and the water by gravity. Many parts of the filter device 1 are formed as a rotating member having a central axis AX as an axis of symmetry. In the following description, a radial direction RD and a circumferential direction CD are defined with respect to the central axis AX.

The filter device 1 includes a case 2. The case 2 provides a fluid passage 10. The case 2 includes a first case 3 and a second case 4. The first case 3 provides a fixed portion fixed to the body of the vehicle. The first case 3 is also called a cap. The first case 3 provides an upper case in a fixed state. The first case 3 defines an inlet passage 11, an inlet gallery 13, and an outlet passage 12. The second case 4 is also called a cup. The second case 4 is a bottomed container with an open top. The second case 4 is configured to be removable from the first case 3. The second case 4 provides a lower case. The second case 4 is configured to be operable by an operator.

A connecting mechanism 5 is formed between the first case 3 and the second case 4. The connecting mechanism 5 connects the first case 3 and the second case 4 in a separable manner. The connecting mechanism 5 is provided by a screw mechanism. The connecting mechanism 5 may be provided by a bayonet lock mechanism, a bolt-nut type tightening mechanism, or a retainer type tightening mechanism.

The filter device 1 includes an element 6 for removing solids. The element 6 is accommodated in the case 2. The element 6 filters the fluid. The element 6 includes a filter member removes minute foreign matter from the fuel. The element 6 can be replaced by opening the case 2.

The filter device 1 includes a water separator 7 for water separation. The water separator 7 is also called a coalescer. The water separator 7 separates a water content from the fluid. The water separator 7 includes a filtration element which is coarser than the filtration element of element 6. As a result, a replacement cycle of the water separator 7 is longer than a replacement cycle of the element 6.

The filter device 1 includes a water level sensor 8. The water level sensor 8 detects a liquid level of water stored in the case 2. The water level sensor 8 outputs a detection signal, for example, when the water level exceeds a predetermined threshold value TH. The threshold value TH indicates an allowable amount of water stored. The detection signal instructs a user or the operator to perform a drainage operation. The detection signal drives, for example, a warning lamp or an automatic drain valve.

The filter device 1 includes a drain valve 9. The drain valve 9 drains the liquid in the case 2 from the lower part of the case 2. In many cases, the drain valve 9 is operated to drain water.

Figure 2:
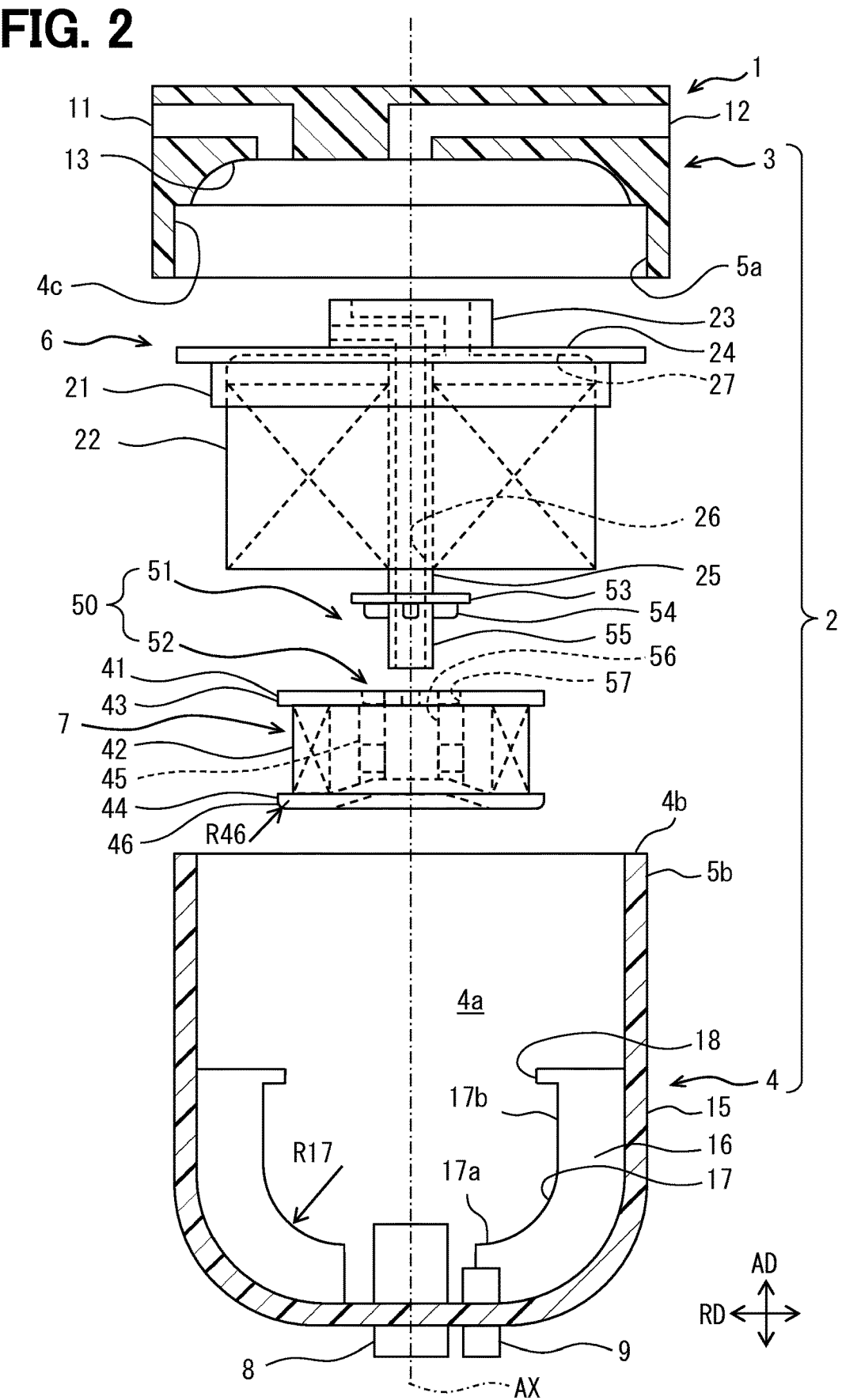
FIG. 2 is an exploded cross-sectional view showing the filter device.

In FIG. 2, the second case 4 defines a volume chamber 4a therein. The inlet gallery 13 and the volume chamber 4a accommodate the element 6 and the water separator 7. An open end of the second case 4 has a positioning surface 4b which defines a position of the element 6 in the axial direction AD. The positioning surface 4b is provided by the open end of the second case 4. The positioning surface 4b may be provided by a step portion formed on the second case 4. The first case 3 has a positioning surface 4c which defines a position of the element 6 in the radial direction RD therein. The positioning surface 4c is provided by a cylindrical surface. The positioning surface 4c defines the movable range of the element 6 in the radial direction RD by coming into contact with the flange 24 described later.

The connecting mechanism 5 includes a female screw surface 5a formed on an inner surface of the first case 3. The connecting mechanism 5 includes a male screw surface 5b formed on an outer surface of the open end of the second case 4. The female screw surface 5a and the male screw surface 5b are tightened or loosened by relatively operating the first case 3 and the second case 4 in the circumferential direction CD.

The second case 4 has a cup-shaped body 15. The body 15 defines the volume chamber 4a. The second case 4 has a plurality of ribs 16 therein. The plurality of ribs 16 provide a holding member for holding the water separator 7 in the second case 4. The holding member holds the water separator 7 with respect to the case 2 while allowing the water separator 7 to move within a movable range with respect to the case 2. As a result, the water separator 7 continues to be held in the second case 4 even when the element 6 is replaced.

The plurality of ribs 16 have a plurality of positioning surfaces 17. The plurality of ribs 16 defines a virtual curved surface inside them. The virtual curved surface is also an inner curved surface. The plurality of positioning surfaces 17 provide a part of the virtual curved surface. The curved surface has a radius R17. The virtual curved surface is an axisymmetric curved surface with the central axis AX as the axis of symmetry. The virtual curved surface is a concave curved surface toward the water separator 7. The plurality of positioning surfaces 17 define a lower end of the movable range of the water separator 7 in the axial direction AD. Since the water separator 7 is pushed from top to bottom, the plurality of positioning surfaces 17 define the specified positions of the water separator 7. The element 6 and the water separator 7 are in direct contact with each other in the axial direction AD. As a result, the water separator 7 is directly pushed by the element 6.

The plurality of positioning surfaces 17 smoothly extend from a bottom surface 17a to a side surface 17b. The bottom surface 17a is a plane parallel to the radial direction RD. The side surface 17b is a surface parallel to the axial direction AD. The plurality of positioning surfaces 17 in this embodiment include both the bottom surface 17a and the side surface 17b. Alternatively, the plurality of positioning surfaces 17 may be a shape which does not include the bottom surface 17a, the side surface 17b, or both the bottom surface 17a and the side surface 17b. The plurality of positioning surfaces 17 may include only curved surfaces. The bottom surface 17a defines the lower end of the movable range in the axial direction AD when the water separator 7 is tilted. The side surface 17b defines the end of the movable range of the water separator 7 in the radial direction RD.

The plurality of positioning surfaces 17 are in contact with the water separator 7. The plurality of positioning surfaces 17 allow the water separator 7 to slide smoothly on the positioning surfaces 17. The plurality of positioning surfaces 17 define a position of the water separator 7 in the axial direction AD. The plurality of positioning surfaces 17 define a lower end position of the water separator 7. The plurality of positioning surfaces 17 define a position of the water separator 7 in the radial direction RD. The plurality of positioning surfaces 17 define an outside position of the water separator 7.

In the case that the water separator 7 is pushed from top to bottom, the water separator 7 moves to slide along the plurality of positioning surfaces 17. As a result, the plurality of positioning surfaces 17 provide a centering function for guiding the water separator 7 to the central axis AX. From this point of view, the plurality of positioning surfaces 17 are also referred to as centering surfaces.

The plurality of ribs 16 have a plurality of holding pieces 18. The plurality of holding pieces 18 hold the water separator 7 with respect to the second case 4. In other words, the plurality of holding pieces 18 are also preventing members which prevent the water separator 7 from being separated from the second case 4. The plurality of holding pieces 18 define an upper end of the movable range of the water separator 7 in the axial direction AD.

The plurality of ribs 16 including the plurality of positioning surfaces 17 and the plurality of holding pieces 18 position the water separator 7 within a specified movable range. The movable range is defined by the plurality of ribs 16. The water separator 7 is movable within the movable range. The water separator 7 can move at least in the radial direction RD in the movable range. The water separator 7 can move at least in the axial direction AD in the movable range. In this embodiment, the water separator 7 is movable in both the radial direction RD and the axial direction AD within the movable range.

Figure 3:
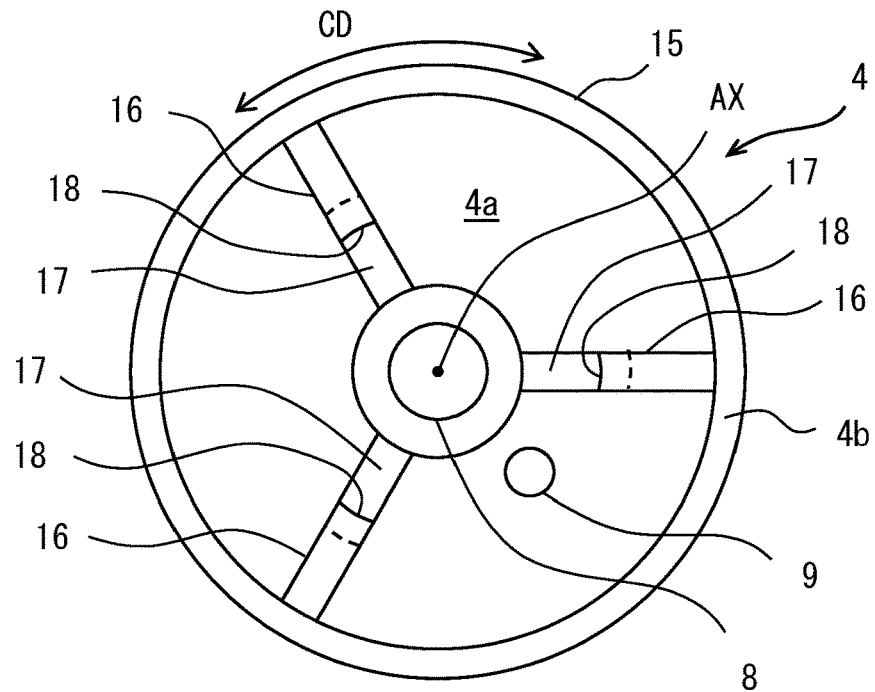
FIG. 3 is a plan view showing an inside of a case.

In FIG. 3, the plurality of ribs 16 are arranged at equal intervals with respect to the circumferential direction CD. The plurality of ribs 16 may be arranged at unequal intervals in the second case 4. The plurality of ribs 16 may include four or more ribs.

Returning to FIGS. 1 and 2, the element 6 has a frame 21 and a filter member 22. The frame 21 is made of resin. The filter member 22 is an axial flow type in which fuel flows in the axial direction AD. The filter member 22 may be a radial flow type such as a chrysanthemum type in which fuel flows in the radial direction RD. The frame 21 includes a center block 23 which provides an inlet and an outlet for the liquid to be filtered. The center block 23 includes a sealing member which separates the dirty side and the clean side by coming into contact with the first case 3. The sealing member may be provided by a rubber lip seal. The frame 21 has a flange 24. The flange 24 abuts on the positioning surface 4b to define a position of the element 6 in the axial direction AD. The frame 21 has a center pipe 25. The center pipe 25 extends from the center block 23 to a lower end of the element 6. The center pipe 25 provides a center passage 26 which reaches a lower end of the element 6. The center passage 26 provides a part of the fuel passage. Further, the frame 21 defines the outlet gallery 27 which guides the fluid flowing out of the filter member 22 to the outlet passage 12.

As a result, the frame 21 defines the inlet gallery 13 as a dirty side and the outlet gallery 27 as a clean side.

The water separator 7 has a frame 41 and a coalescing member 42. The frame 41 is made of resin. The frame 41 supports the coalescing member 42. The frame 41 has an upper plate 43, a lower plate 44, and a center pipe 45. The upper plate 43 and the lower plate 44 are members that can come into contact with the plurality of ribs 16. The coalescing member 42 capture fine particles of water and promote their growth into water droplets.

The upper plate 43 and the lower plate 44 define the movable range of the water separator 7 by interfering with the plurality of ribs 16. In particular, the lower plate 44 has an edge 46 that is in contact with the plurality of ribs 16. The edge portion 46 can move while being in contact with the plurality of positioning surfaces 17. The edge portion 46 is formed by a curved surface. The curved surface has a radius R46. The radius R46 is smaller than the radius R17 (R46<R17). The radius R46 is apparently smaller than the radius R17 (R46<<R17). As a result, the edge portion 46 can smoothly move on the plurality of positioning surfaces 17.

The element 6 and the water separator 7 are configured to be connectable by a passage connecting mechanism 50. In other words, the element 6 and the water separator 7 are configured to be separable by the passage connecting mechanism 50. The passage connecting mechanism 50 provides meshing of the element 6 and the water separator 7 with respect to at least in the axial direction AD. The meshing in the axial direction AD pushes the water separator 7 against the plurality of ribs 16 toward the axial direction AD by the element 6. As a result, the water separator 7 is fixed with respect to the axial direction AD. The passage connecting mechanism 50 provides meshing of the element 6 and the water separator 7 with respect to at least in the radial direction RD. The meshing in the radial RD positions the water separator 7 at a specified position in the radial direction RD by the element 6. As a result, the water separator 7 is fixed with respect to the radial direction RD. The passage connecting mechanism 50 provides meshing of the element 6 and the water separator 7 with respect to at least in the circumferential direction CD. The meshing in the circumferential direction CD positions the water separator 7 at a specified position in the circumferential direction CD by the element 6. As a result, the water separator 7 is fixed with respect to the circumferential direction CD.

In FIG. 2, the passage connecting mechanism 50 includes a passage connecting member 51 and a passage connecting member 52. Two passage connecting members 51 and 52 form a fluid passage between the element 6 and the water separator 7. The two passage connecting members 51 and 52 connect the element 6 and the water separator 7 in a separable manner. The passage connecting member 51 and the passage connecting member 52 mesh with each other to form a fuel passage which communicates the end pipe 55 and an inside of the water separator 7. The passage connecting member 51 and the passage connecting member 52 provide a sealing property which suppresses fuel leakage. The sealing property is set so that the fuel passes through the coalescing member 42. The sealing property does not have to be perfect. The passage connecting member 51 is provided on the element 6. The passage connecting member 52 is provided on the water separator 7.

The passage connecting member 51 has a flange 53 which mainly provides meshing in the axial direction AD. The flange 53 is orthogonal to the central axis AX. The flange 53 extends in the radial direction RD. The upper plate 43 and the flange 53 provide an axial seal member by coming into contact with respect to the axial direction AD or by facing each other with a minute gap. The axial seal member provides relatively stable sealing performance even if there is an error in the element 6 and the water separator 7 with respect to the radial direction RD.

The passage connecting member 51 has at least one key protrusion 54. The passage connecting member 51 has a plurality of key protrusions 54 arranged at equal intervals or unequal intervals. The key protrusion 54 is formed between the flange 53 and the end pipe 55. The key protrusion 54 provides a surface facing the circumferential direction CD.

The passage connecting member 51 has an end pipe 55. The end pipe 55 is positioned on an extension of the center pipe 25. The end pipe 55 provides a part of the fuel passage. The end pipe 55 provides meshing mainly in the radial direction RD.

The passage connecting member 52 has a center bore 56 provided by the center pipe 45. The center bore 56 can accept the end pipe 55. In other words, the end pipe 55 can be inserted into the center bore 56.

The passage connecting member 52 has at least one key groove 57. The passage connecting member 52 has a plurality of key grooves 57 arranged at equal intervals or unequal intervals. The key grooves 57 provides a surface facing the circumferential direction CD. The key groove 57 can accept the key protrusion 54. In other words, the key protrusion 54 can be inserted into the key groove 57. The key groove 57 is formed at a corner between the upper plate 43 and the center pipe 45. The key protrusion 54 and the key groove 57 mesh with each other to provide meshing between the element 6 and the water separator 7 mainly in the circumferential direction CD. The key protrusion 54 and the key groove 57 provide a coupling member. The coupling member connects the element 6 and the water separator 7 so as to move together with respect to the circumferential direction CD.

Figure 4:
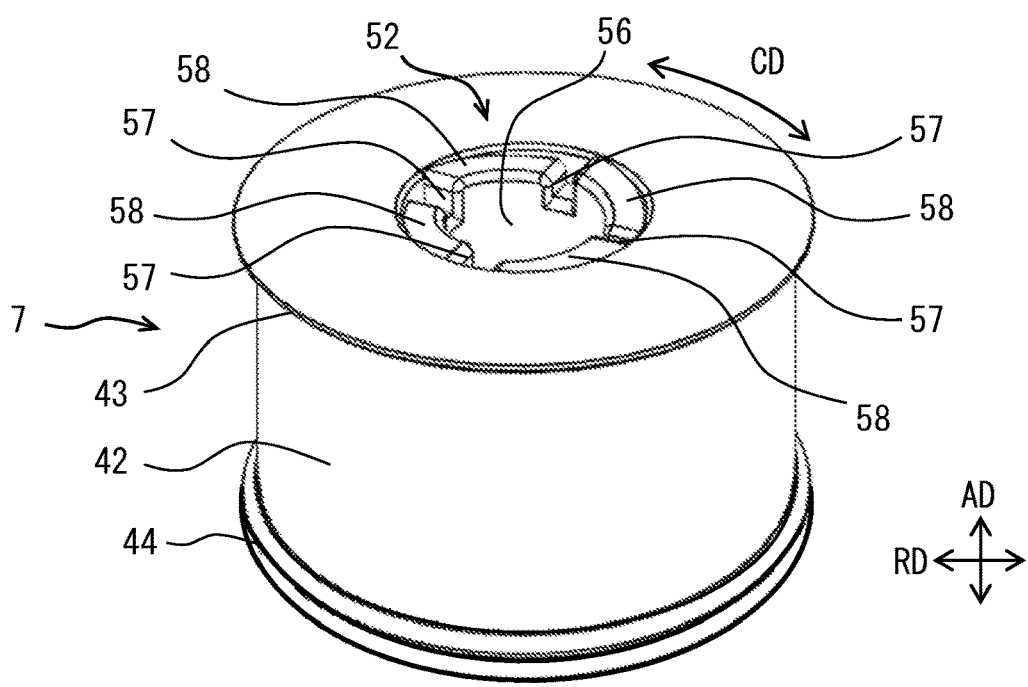
FIG. 4 is a perspective view showing a water separator.

In FIG. 4, the passage connecting member 52 has a slope 58 formed adjacent to the key grove 57. The slope 58 faces the axial direction AD. A depth of the slope 58 in the axial direction AD gradually increases or decreases along the circumferential direction CD. The slope 58 is inclined along the circumferential direction CD. The slope 58 assists the engagement of the key protrusion 54 and the key groove 57. When the element 6 and the water separator 7 are relatively rotated in the circumferential direction CD, the key protrusion 54 moves on the slope 58 in a sliding manner. As a result, the slope 58 assists in searching for a meshing position between the key protrusion 54 and the key groove 57 in the circumferential direction CD.

Returning to FIG. 1, a flow of fuel to be filtered is illustrated by arrows. Fuel is supplied to the inlet passage 11. The fuel flows into the inlet gallery 13 from the inlet passage 11. The fuel flows from the inlet gallery 13 into the center passage 26 which opens into the center block 23. The fuel passes through the center passage 26 and flows into the water separator 7. The minute water content in the fuel is captured by the coalescing member 42. The coalescing member 42 captures and accumulates water content to grow into water droplets. In addition, the coalescing member 42 releases the grown water droplets again into a fuel stream. The released water droplets are separated from the fuel by gravity in the volume chamber 4a. The water droplets settle in the volume chamber 4a and be collected in a lower part of the volume chamber 4a. The fuel flows into the filter member 22 from the volume chamber 4a. The fuel is filtered by the filter member 22. The filter member 22 removes solid particles contained in the fuel. The fuel that has passed through the filter member 22 flows out to the outlet gallery 27. The fuel flows from the outlet gallery 27 through the center block 23 and into the exit passage 12. The fuel flows out from the outlet passage 12.

The plurality of steps in the method of manufacturing a filter device are also a part of the plurality of steps in the method of replacing the element. In the element replacement method, a plurality of steps in the method of manufacturing the filter device are executed. The element replacement method is also a method for re-manufacturing the filter device. In the case that the method of manufacturing a filter device is performed at a manufacturing stage of a first brand new filter device, it is manufactured a filter device which may be capable of providing different replacing cycles for the water separator and the element. In another aspect, it is manufactured a filter device which may be able to replace the element while reusing the water separator. In still another aspect, it is manufactured a filter device which allows an error between the water separator and the element. In the case that the method of manufacturing the filter device is performed in the method of replacing the element, it is manufactured again a filter device which may be capable of providing different replacing cycles for the water separator and the element. In another aspect, it is manufactured again a filter device which may be able to replace the element while reusing the water separator. In still another aspect, it is manufactured again a filter device which allows an error between the water separator and the element.

The method for manufacturing the filter device includes a plurality of steps for preparing each of the first case 3, the second case 4, the element 6, and the water separator 7. The method for manufacturing the filter device includes a step of mounting the water separator 7 in the second case 4. This step provides a holding step of holding the water separator 7 against the second case 4. In this step, the water separator 7 is positioned in a movable range defined by the plurality of ribs 16. The plurality of holding pieces 18 receive the water separator 7 in the movable range by deformation in the plastic region and/or the elastic region. Alternatively, the plurality of holding pieces 18 may be formed after receiving the water separator 7 in the movable range. Alternatively, the water separator 7 and the plurality of holding pieces 18 may be configured to accept the water separator 7 in a movable range only when the water separator 7 is positioned at a specific position with respect to the circumferential direction CD. The water separator 7 may have, for example, an uneven portion which meshes with a plurality of holding pieces 18 only at specific positions.

The method for manufacturing the filter device includes a connecting step of connecting the passage connecting member 51 and the passage connecting member 52. The connecting step is a step of making the passage connecting member 51 provided in the element 6 and the passage connecting member 52 provided in the water separator 7 to come into contact with each other. The connecting step includes a step of inserting the element 6 into a second case assembly. The second case assembly includes the second case 4 and the water separator 7. In this step, the element 6 and the water separator 7 are connected by the passage connecting mechanism 50 so as to form a passage. In this step, the element 6 and the water separator 7 are separably connected. Further, the element 6 and the water separator 7 may be positioned at a specified position.

The connecting step includes a radial meshing step in which the end pipe 55 is inserted into the center bore 56 and the element 6 and the water separator 7 are meshed with respect to the radial direction RD. The connecting step includes a circumferential meshing step in which the key protrusion 54 is inserted into the key groove 57 and the element 6 and the water separator 7 are meshed with respect to the circumferential direction CD. Further, the connecting step includes an axial pushing step of pushing the water separator 7 by the element 6 by making the element 6 and the water separator 7 to come into contact directly or indirectly with each other in the axial direction AD. In the axial pushing step, the flange 53 is pushed onto the water separator 7.

The method for manufacturing a filter device includes a moving step of moving the water separator 7 with respect to the second case 4 in a movable range. The moving step is a step of moving the water separator 7 while keeping the two passage connecting members 51 and 52 in contact with each other. The water separator 7 is movable within a movable range with respect to the second case 4. Therefore, in a work of connecting the passage connecting mechanism 50, a work of mounting the element 6 is improved. In the moving step, the water separator 7 moves in a sliding manner along the positioning surface 17 provided by the case 2.

By providing the moving step, displacement of the element 6 and/or the water separator 7 in the radial direction RD is allowed. In another aspect, tilting of the element 6 and/or the water separator 7 is allowed.

In the moving step, the plurality of positioning surfaces 17 guide the water separator 7 toward the central axis AX by coming into contact with the water separator 7. In other words, the positioning surface 17 provides the centering function. Further, the engagement between the key protrusion 54 and the key groove 57 enables the water separator 7 to rotate and promotes a centering action.

The method for manufacturing the filter device includes a closing step of connecting the first case 3 and the second case 4 and closing the case 2. In this step, the first case 3 and the second case 4 are connected by the connecting mechanism 5. In this step, the first case 3 and the second case 4 are connected so as to accommodate the element 6 and the water separator 7 in the case 2. In this step, the element 6 and the water separator 7 are positioned at specified positions in both the axial direction AD and the radial direction RD. Also in this step, since the water separator 7 can move within the movable range, a work of connecting the first case 3 and the second case 4 is improved.

Figure 5:
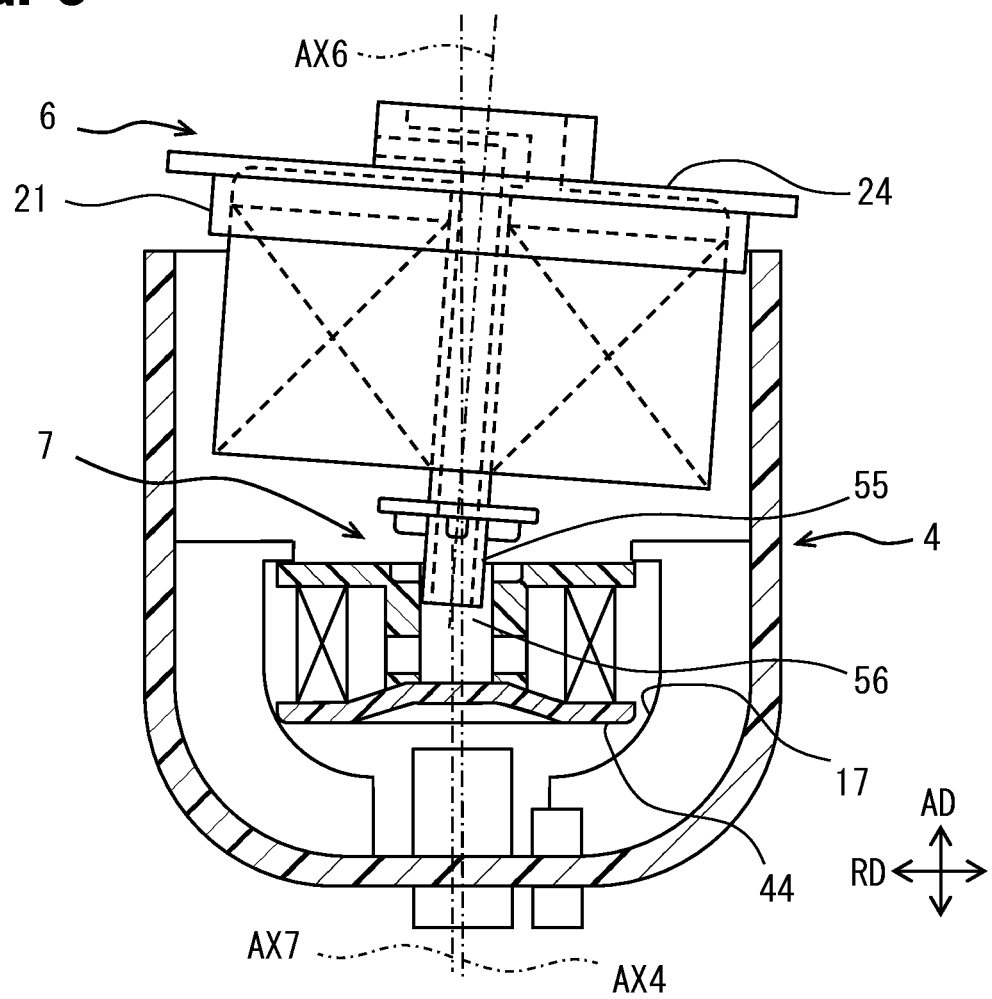
FIG. 5 is a cross-sectional view showing an attaching step.

FIG. 5 shows an example of a step of inserting the element 6 into the second case assembly. An example is illustrated in which the central axis AX6 of the element 6 is tilted with respect to the central axis AX4 of the second case 4. The water separator 7 is movable within a movable range. Therefore, despite an inclination of the central axis AX6, the end pipe 55 can be inserted into the center bore 56 at an initial stage of the process. In the middle stage of the process, it is possible to push the element 6 deeper along the axial direction AD. In this process, the water separator 7 moves within the movable range, and allows the central axis AX6 to coincide with the central axis AX4. Moreover, the centering function provided by the plurality of ribs 16 makes the central axis AX7 of the water separator 7 coincide with the central axis AX4. Therefore, the moving step includes a step of moving the central axis AX7 of the water separator 7 toward the central axis AX4 of the second case 4.

Figure 6:
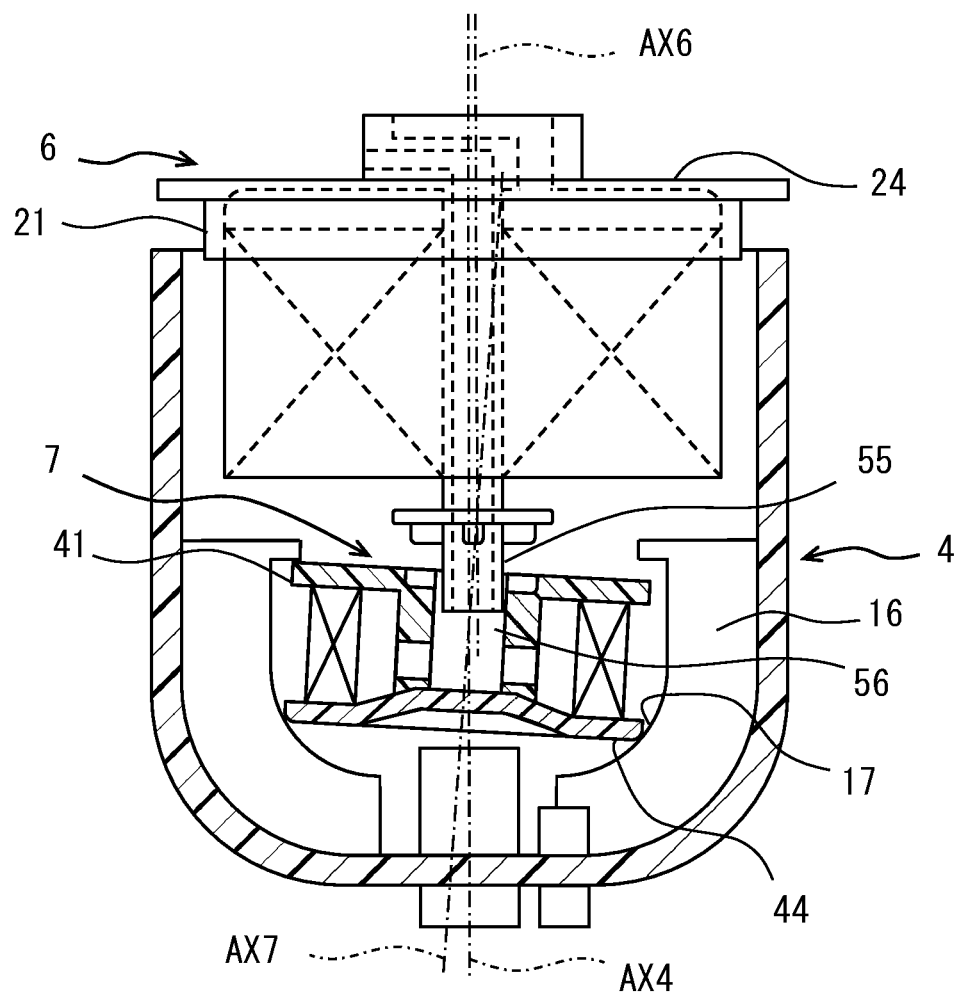
FIG. 6 is a cross-sectional view showing an attaching step.

FIG. 6 shows an example of a step of inserting the element 6 into the second case assembly. An example is illustrated in which the central axis AX7 of the water separator 7 is tilted with respect to the central axis AX4 of the second case 4. In this case as well, the water separator 7 is movable within the movable range. Therefore, despite an inclination of the central axis AX7, the end pipe 55 can be inserted into the center bore 56 at an initial stage of the process. In the middle stage of the process, it is possible to push the element 6 deeper along the axial direction AD. In this process, the water separator 7 moves within the movable range, and allows the central axis AX6 to coincide with the central axis AX4. Moreover, the centering function provided by the plurality of ribs 16 makes the central axis AX7 of the water separator 7 coincide with the central axis AX4. The moving step includes a step of moving the central axis AX7 of the water separator 7 toward the central axis AX4 of the second case 4.

Figure 7:
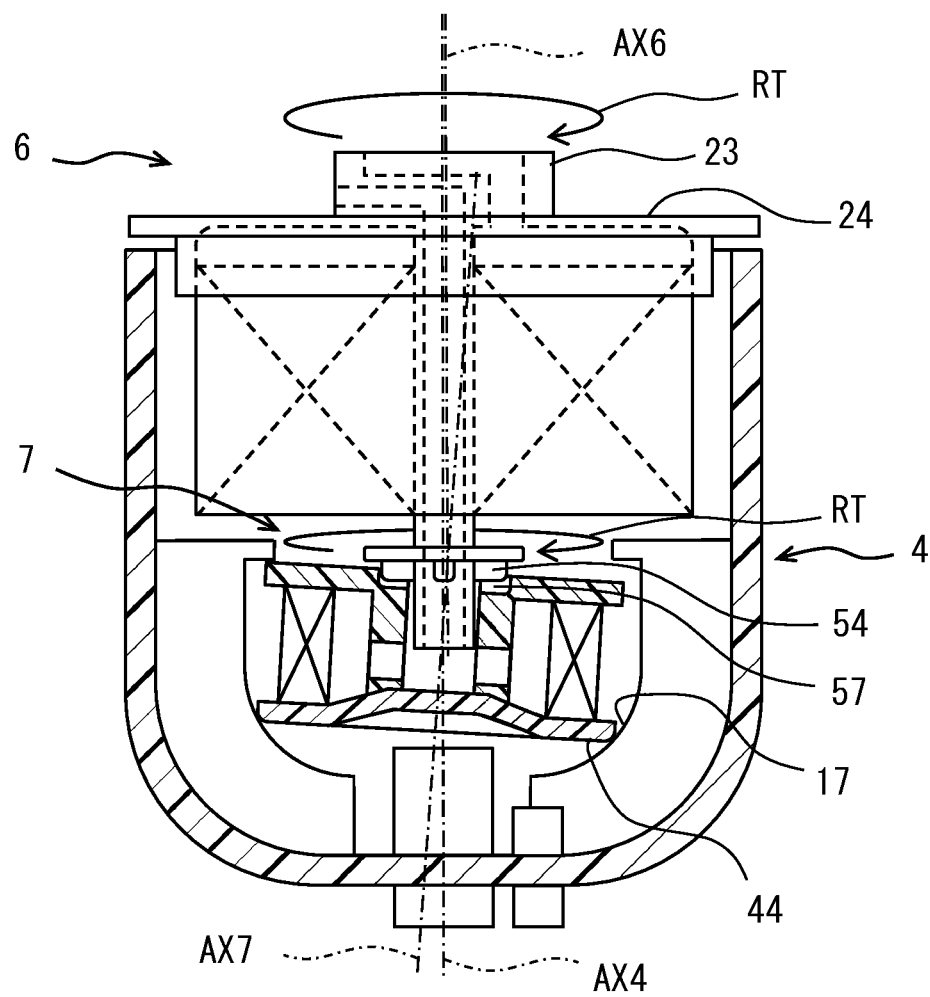
FIG. 7 is a cross-sectional view showing an attaching step.

FIG. 7 shows an example of a step of inserting the element 6 into the second case assembly. An example is illustrated in which the central axis AX7 of the water separator 7 is tilted with respect to the central axis AX4 of the second case 4. As the key projection 54 meshes with the key groove 57 in a middle to final stage of the step, the rotation RT applied to the element 6 is transmitted to the water separator 7. A rotation of the water separator 7 facilitates a moving motion of the water separator 7 along the positioning surface 17 in a sliding manner. As a result, the element 6 can be pushed deeper along the axial direction AD.

Figure 8:
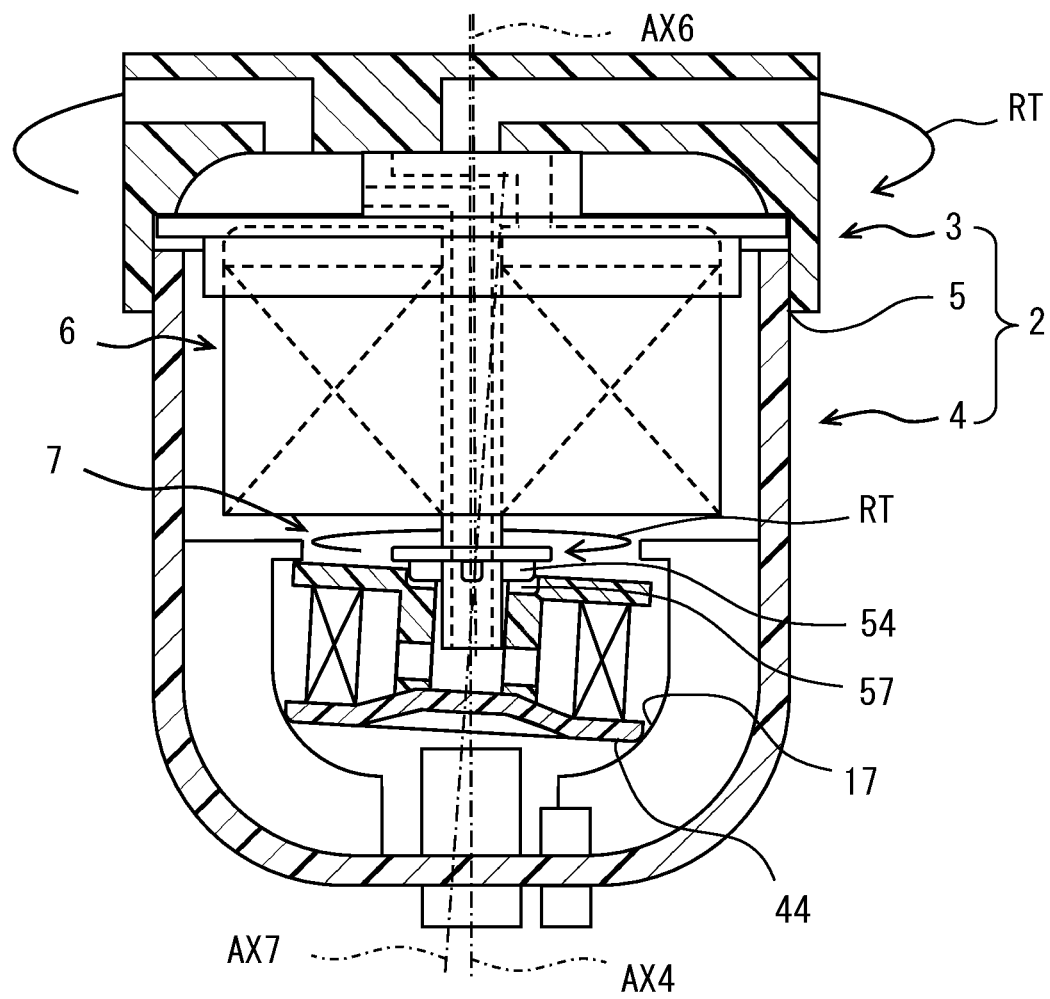
FIG. 8 is a cross-sectional view showing an attaching step.

FIG. 8 shows an example of a process of connecting the first case 3 and the second case 4. An example in which a relative rotation RT is applied between the first case 3 and the second case 4 is illustrated. Also in this case, as the key protrusion 54 meshes with the key groove 57, the rotation RT is transmitted to the water separator 7 via the element 6. As a result, the element 6 can be pushed deeper along the axial direction AD.

Figure 9:
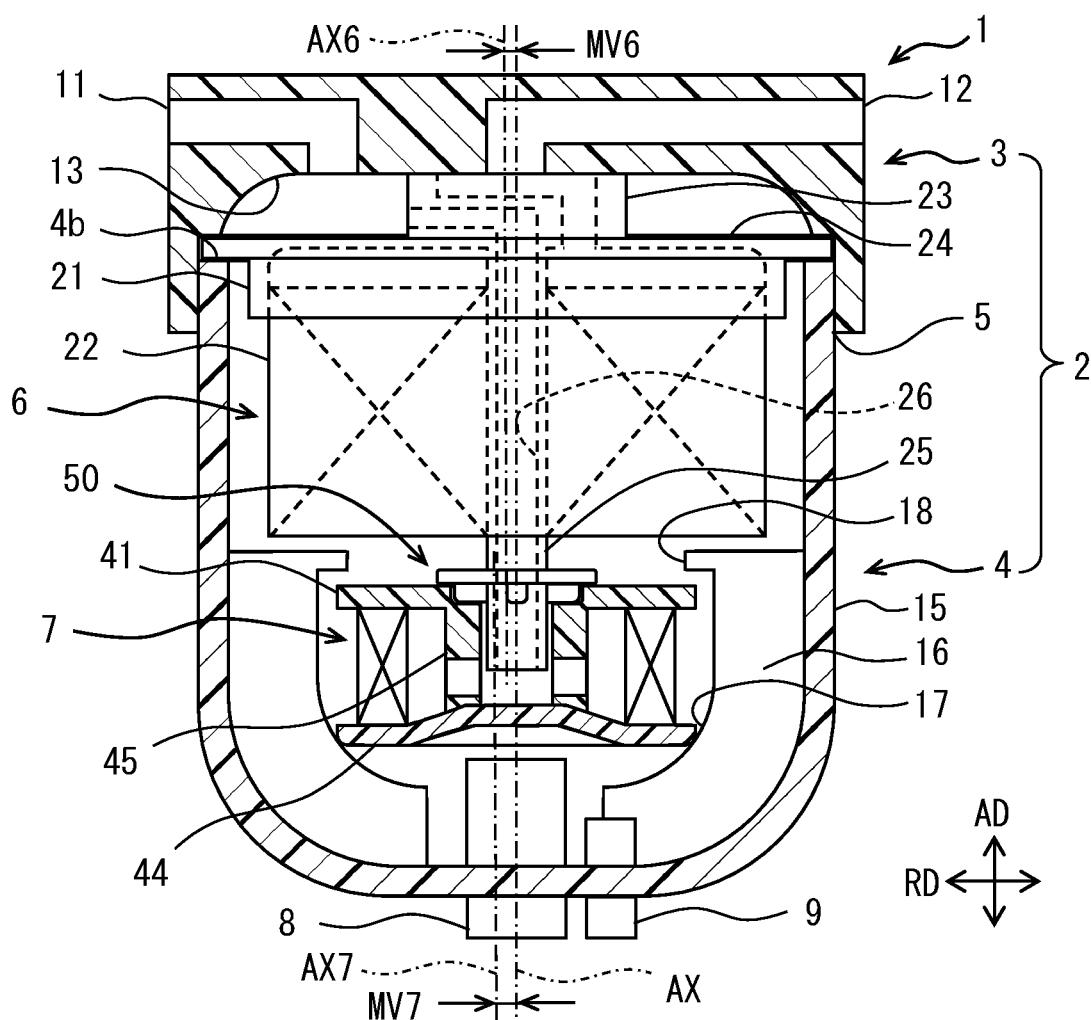
FIG. 9 is a cross-sectional view showing the filter device.

In FIG. 9, a state in which the first case 3 and the second case 4 are completely connected is illustrated. The element 6 is held between the first case 3 and the second case 4. The position of the element 6 in the axial direction AD is defined by the positioning surface 4b. The passage connecting mechanism 50 pushes the water separator 7 with respect to the axial direction AD. As a result, the water separator 7 is held between the passage connecting mechanism 50 and the plurality of ribs 16. Moreover, since the water separator 7 is centered by the curved surface of the positioning surface 17, the water separator 7 can be arranged on the central axis AX.

Figure 10:
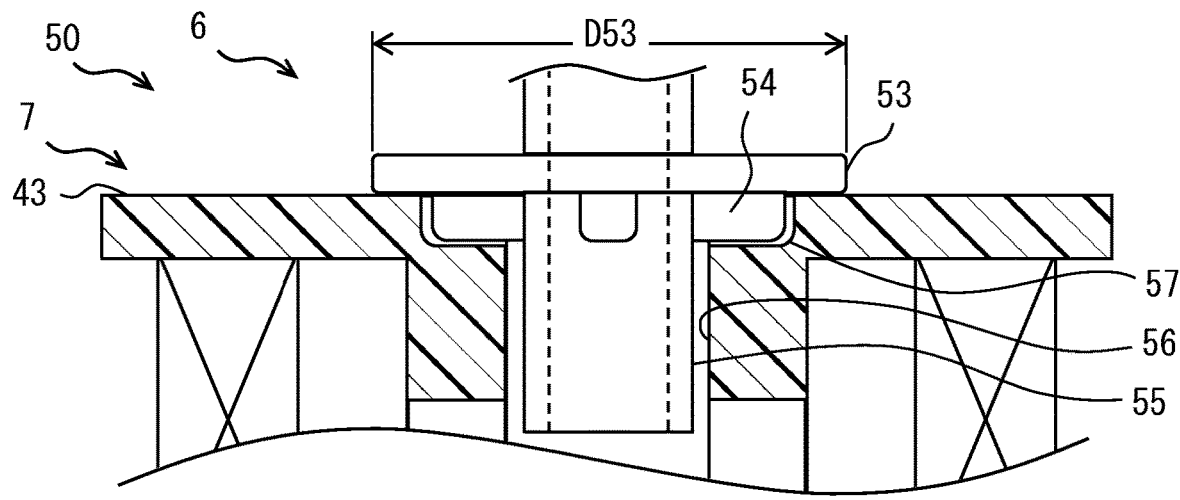
FIG. 10 is an enlarged cross-sectional view showing a passage connecting mechanism.

In FIG. 10, a flange 53 extends radially outward from the end pipe 55. The flange 53 is a circular plate having a diameter of D53. The flange 53 is in contact with the upper plate 43. The element 6 pushes the water separator 7 downward through the flange 53. This provides a required sealing performance between the element 6 and the water separator 7. The end pipe 55 and the center bore 56 have a relatively large gap to allow easy insertion. The key protrusion 54 and the key groove 57 have a relatively large gap to allow easy insertion.

Returning to FIG. 9, the element 6 can move in the case 2 by a movable distance MV6 from the central axis AX with respect to the radial direction RD. The movable distance MV6 is also an error range in the radial direction RD. The first case 3 and the second case 4 are also support members for supporting the element 6. Therefore, the case 2 includes a support member which movably supports the element 6 by the movable distance MV6 in the radial direction RD.

The water separator 7 can move from the central axis AX by a movable distance MV7 with respect to the radial direction RD. The movable distance MV7 is also an error range in the radial direction RD. The movable distance MV6 is set to be smaller than the movable distance MV7 (MV6<MV7). In a preferred embodiment, the movable distance MV6 is set to be smaller than ½ of the movable distance MV7 (MV6<½· MV7).

Such a setting makes it possible to easily perform an initial work of inserting the end pipe 55 into the center bore 56. Further, a work of inserting the end pipe 55 into a depth of the center bore 56 is enabled. Therefore, a work error is allowed. In addition, an error range of the water separator 7 allows the passage connecting mechanism 50 to form a sealing function in a closed condition of the case 2. Even if there is a dimensional error of the element 6 and the water separator 7, the passage connecting mechanism 50 can provide a sealing function. This embodiment also provides a filter device and a method for manufacturing a filter device which is capable of supporting different replace cycles for the element 6 and the water separator 7.

In this embodiment, the illustration is drawn with some exaggeration of the elements described. As a more detailed description of the elements in this embodiment, the description in WO2017/110542A and/or WO2018/008327A is incorporated by reference, if necessary.

According to the embodiment described above, it is possible to provide a filter device and a method for manufacturing a filter device which is capable of supporting different replace cycles for the element 6 and the water separator 7. Moreover, it is possible to provide a filter device and a method for manufacturing the filter device in which the element 6 for solid removal can be replaced while leaving the water separator 7. Moreover, errors with respect to the axial direction AD and/or the radial direction RD are tolerated.

In this embodiment, the water separator 7 is held within the movable range by the plurality of ribs 16. Therefore, it is possible to realize the passage connection between the element 6 and the water separator 7 while allowing an error. Moreover, the water separator 7 is automatically adjusted toward the central axis AX. Therefore, the water separator 7 can be held in the specified position while allowing an error.

Second Embodiment

This embodiment is a modification based on the preceding embodiment. In the above embodiment, a relatively large gap is formed between the end pipe 55 and the center bore 56. Alternatively, in this embodiment, a sealing element is added to the gap in the radial direction RD. The sealing element is provided by a pressure drop element. The shape of this embodiment is also available in other embodiments disclosed herein.

Figure 11:
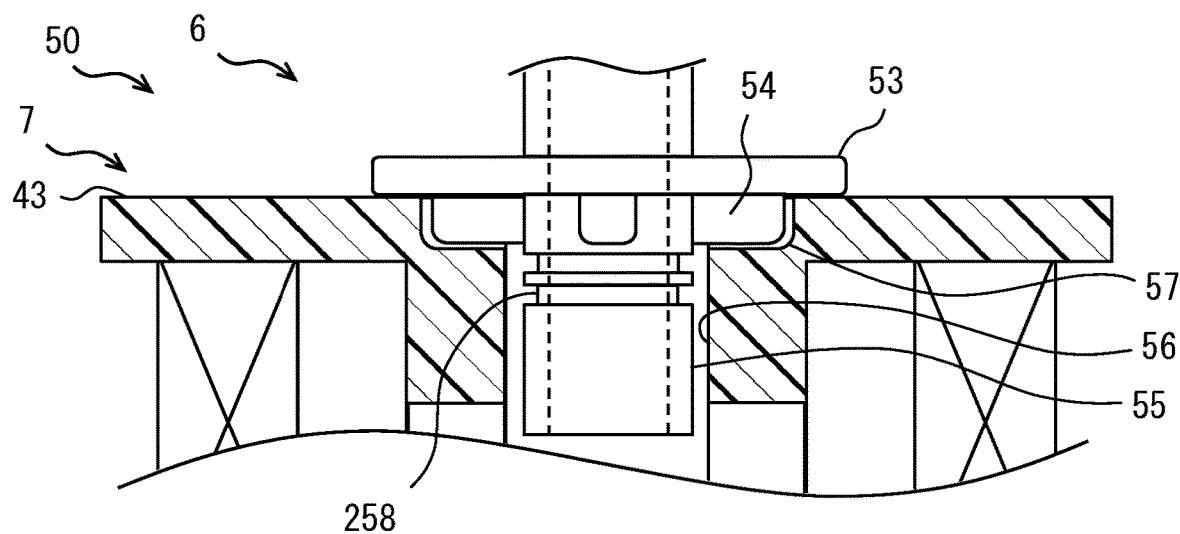
FIG. 11 is an enlarged cross-sectional view showing a passage connecting mechanism of a second embodiment.

In FIG. 11, the end pipe 55 has an annular groove 258 as a pressure loss element. The end pipe 55 has a plurality of annular grooves 258. The annular groove 258 provides a rectangular cross-sectional shape.

The plurality of annular grooves 258 are formed only at a root portion of the end pipe 55. The plurality of annular grooves 258 are not formed at a distal end portion of the end pipe 55. As a result, interference in the process of inserting the end pipe 55 into the center bore 56 is suppressed.

The annular groove 258 causes a pressure loss by forming a change in a flow path area. The annular groove 258 provides a radial sealing member. Moreover, the annular groove 258 provides a non-contact type radial sealing member. The annular groove 258 enhances a sealing property between the element 6 and the water separator 7. The annular groove as a pressure loss element may be provided in the center bore 56.

Third Embodiment

Figure 12:
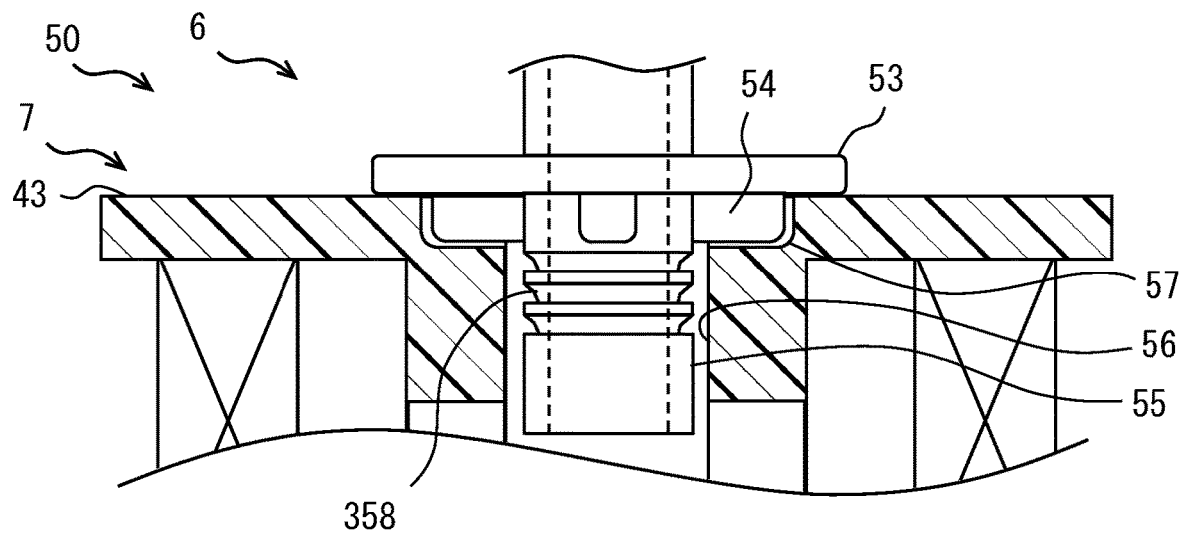
FIG. 12 is an enlarged cross-sectional view showing a passage connecting mechanism of a third embodiment.

This embodiment is a modification based on the preceding embodiment. The shape of this embodiment is also available in other embodiments disclosed herein. In FIG. 12, the end pipe 55 has an annular groove 358. The annular groove 358 provides a cross-sectional shape with an inclined surface. The inclined surface is a surface which directs both a radial direction outside of the end pipe 55 and an axial direction distal end side of the end pipe 55. The inclined surface suppresses interference in the process of inserting the end pipe 55 into the center bore 56.

Fourth Embodiment

This embodiment is a modification based on the preceding embodiment. In the above embodiments, the passage connecting member 51 includes a flange 53 having a diameter D53. Alternatively, in this embodiment, a sealing element is added to the gap in the axial direction AD. The sealing element provides a sealing function by physical contact. The sealing element is provided by a wider contact area. The shape of this embodiment is also available in other embodiments disclosed herein.

Figure 13:
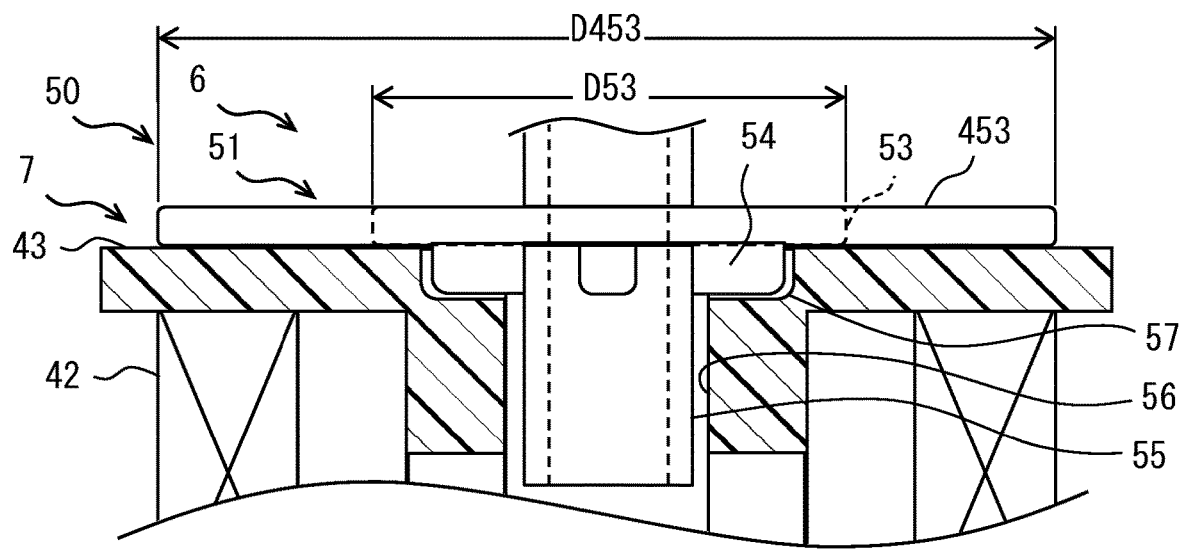
FIG. 13 is an enlarged cross-sectional view showing a passage connecting mechanism of a fourth embodiment.

In FIG. 13, the passage connecting member 51 has a flange 453. The flange 453 has a diameter of D453. The diameter D453 is larger than the diameter D53 (D53<D453). The flange 453 has a large area to improve the sealing property. The diameter D453 is closer to the diameter of the upper plate 43 than the diameter of the center bore 56. The diameter D453 is closer to a diameter of the coalescing member 42 than a diameter of the center bore 56. The flange 453 suppresses a relative inclination of the central axis AX6 and the central axis AX7 by interfering the flange 453 with the upper plate 43 in the radial gap.

Fifth Embodiment

This embodiment is a modification based on the preceding embodiment. In the above embodiments, the flanges 53 and 453 are in contact with the upper plate 43. Alternatively, in this embodiment, a sealing element is added to the gap in the axial direction AD. The sealing element provides a sealing function by physical contact. The shape of this embodiment is also available in other embodiments disclosed herein.

Figure 14:
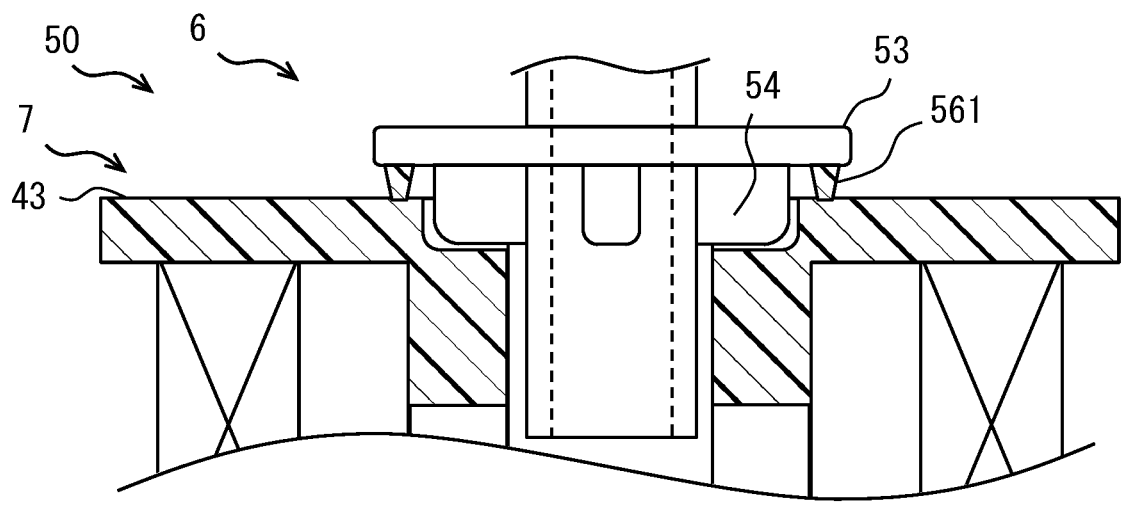
FIG. 14 is an enlarged cross-sectional view showing a passage connecting mechanism of a fifth embodiment.

In FIG. 14, the flange 53 includes an annular sealing member 561. The seal member 561 provides a seal element. The seal member 561 is located radially outward of the plurality of key protrusions 54. The seal member 561 is a protrusion protruding from the flange 53. The seal member 561 is integrally formed with the flange 53 by a continuous resin material. The seal member 561 may be provided by a member separate from the flange 53. The seal member 561 may be provided by, for example, a separate O-ring, lip seal member, or the like. The seal member 561 is elastically deformed by contact with the upper plate 43. Further, the seal member 561 is also plastically deformed by contact with the upper plate 43.

Figure 15:
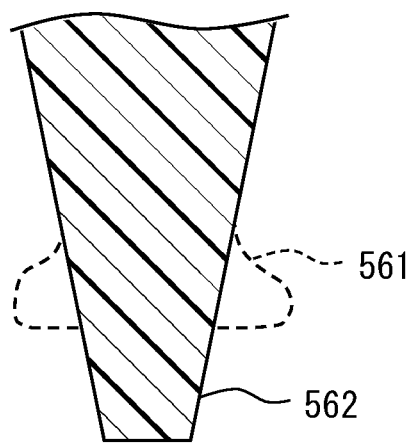
FIG. 15 is an enlarged cross-sectional view showing a seal protrusion.

In FIG. 15, the member 562 before deformation is shown. The member 562 is deformed by contact with the upper plate 43 and demonstrates a sealing function.

Figure 16:
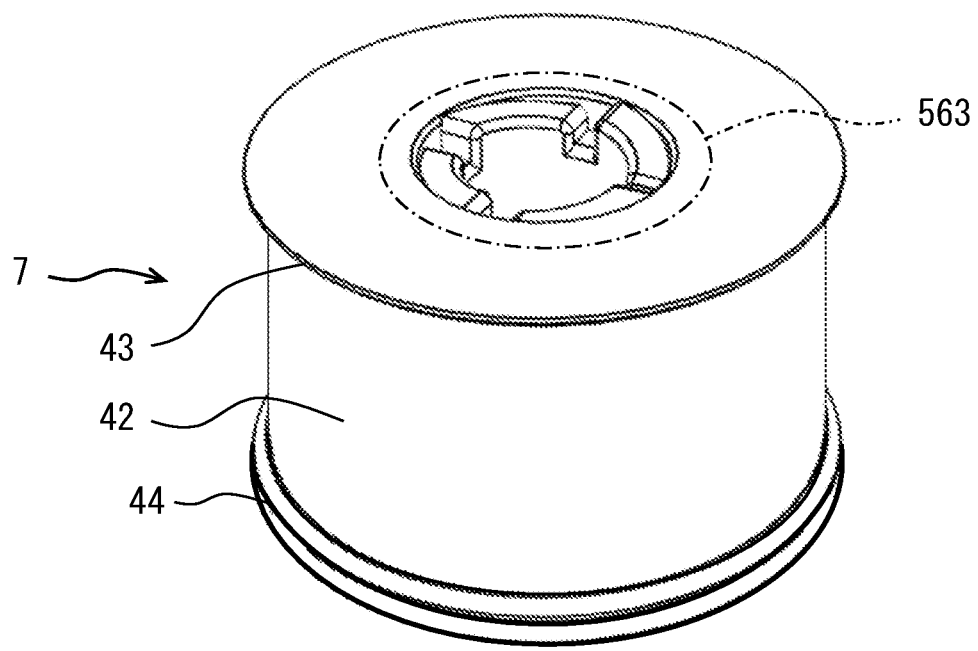
FIG. 16 is an enlarged cross-sectional view showing a contact line in the water separator.

FIG. 16 shows a contact line 563 between the seal member 561 and the upper plate 43. The seal member 561 is in contact with the water separator 7 along the contact line 563. This provides a high sealing performance between the element 6 and the water separator 7. The seal member 561 provides an axial seal member. Moreover, the seal member 561 provides a contact type axial seal member.

Sixth Embodiment

This embodiment is a modification based on the preceding embodiment. In the above embodiments, the annular groove 258 and 358 adds a sealing element to the gap in the radial direction RD. Alternatively, in this embodiment, a sealing element is added to the gap in the axial direction AD. The sealing element is provided by a pressure drop element. The shape of this embodiment is also available in other embodiments disclosed herein.

Figure 17:
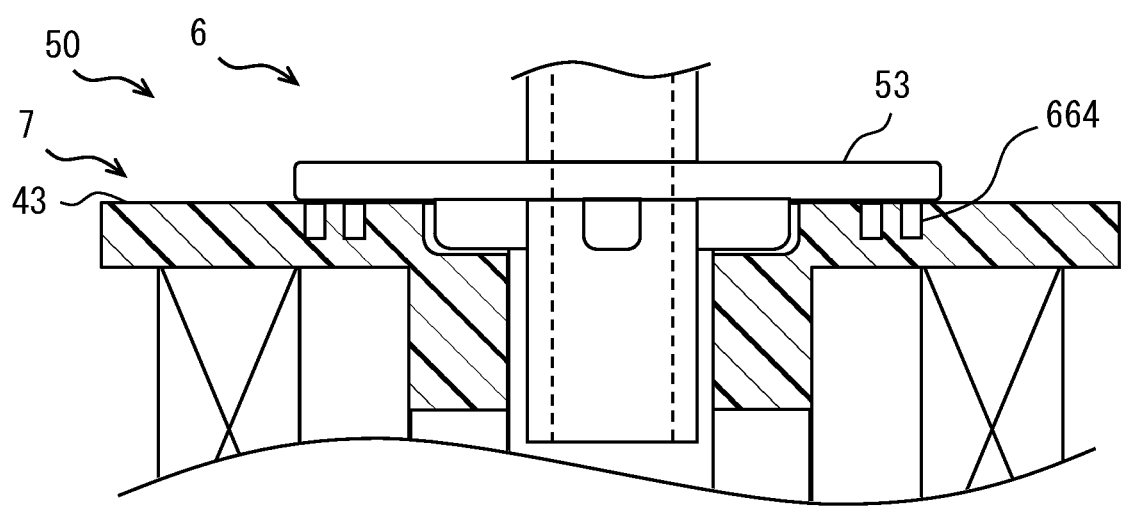
FIG. 17 is an enlarged cross-sectional view showing a passage connecting mechanism of a sixth embodiment.

In FIG. 17, the upper plate 43 has an annular groove 664 as a pressure drop element. The upper plate 43 has a plurality of annular grooves 664. The annular groove 664 provides a rectangular cross-sectional shape. The annular groove 664 causes a pressure loss by forming a change in a flow path area. The annular groove 664 enhances a sealing property between the element 6 and the water separator 7. The annular groove as a pressure loss element may be provided on the flange 53.

Seventh Embodiment

This embodiment is a modification based on the preceding embodiment. In the above embodiments, the annular groove 664 adds a sealing element to the gap in the axial direction AD. Alternatively, in this embodiment, a pressure drop element is provided by grooves and protrusions which mesh with each other. The shape of this embodiment is also available in other embodiments disclosed herein.

Figure 18:
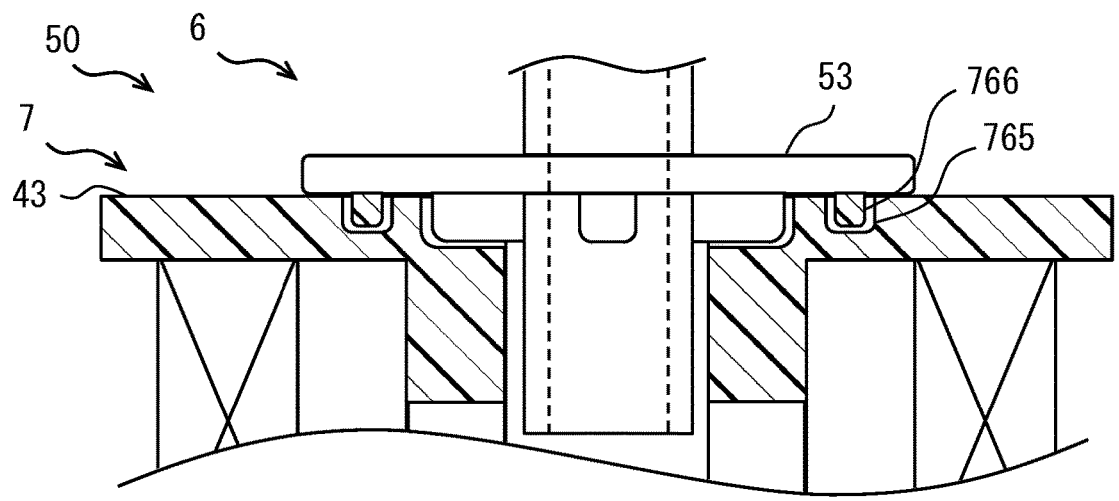
FIG. 18 is an enlarged cross-sectional view showing a passage connecting mechanism of a seventh embodiment.

In FIG. 18, the upper plate 43 has an annular groove 765. The flange 53 has an annular protrusion 766. A set of annular grooves 765 and annular protrusions 766 mesh with each other. A minute gap is formed between the annular groove 765 and the annular protrusion 766. The annular groove 765 and the annular protrusion 766 cause a pressure loss by forming a change in a flow path area. The annular groove 765 and the annular protrusion 766 enhance a sealing property between the element 6 and the water separator 7. The annular groove as a pressure loss element may be provided on the flange 53. Alternative to this embodiment, the upper plate 43 may have an annular protrusion 766 and the flange 53 may have an annular groove 765. Further, a plurality of sets may be formed by the plurality of annular grooves 765 and the plurality of annular protrusions 766.

Eighth Embodiment

This embodiment is a modification based on the preceding embodiments. In the above embodiments, the flange 53 and 453 adds a sealing element to the gap in the axial direction AD. Alternatively, in this embodiment, the sealing element is provided by an umbrella-shaped flange that provides an elastic contact. The shape of this embodiment is also available in other embodiments disclosed herein.

Figure 19:
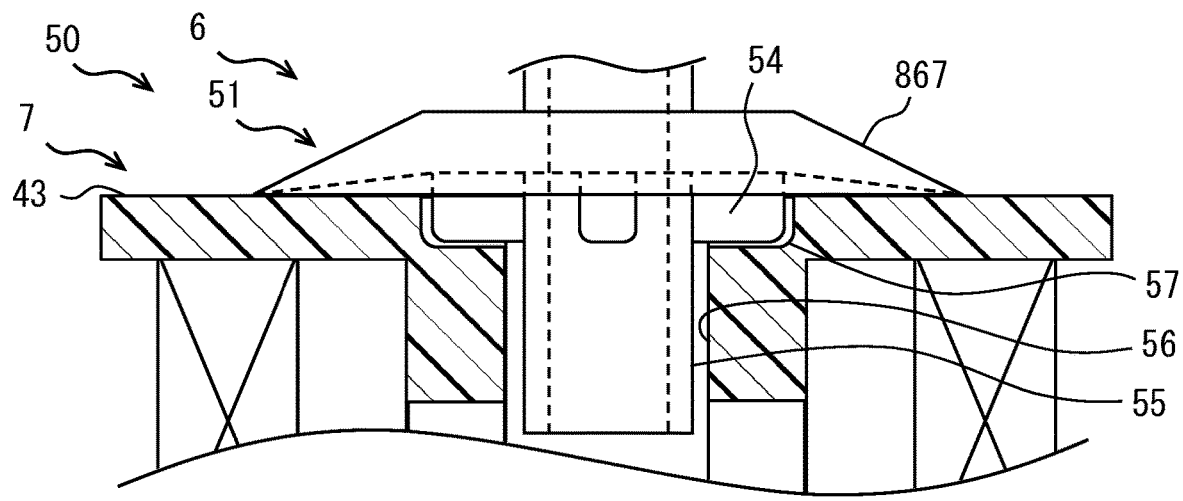
FIG. 19 is an enlarged cross-sectional view showing a passage connecting mechanism of an eighth embodiment.

In FIG. 19, the passage connecting member 51 includes an umbrella-shaped flange 867 instead of the flange 53. The umbrella-shaped flange 867 comes in contact with the upper plate 43 in an elastic manner.

Ninth Embodiment

This embodiment is a modification based on the preceding embodiments. In this embodiments, a sealing element is added to the gap in the radial direction RD. The sealing element provides a sealing function by physical contact. The shape of this embodiment is also available in other embodiments disclosed herein.

Figure 20:
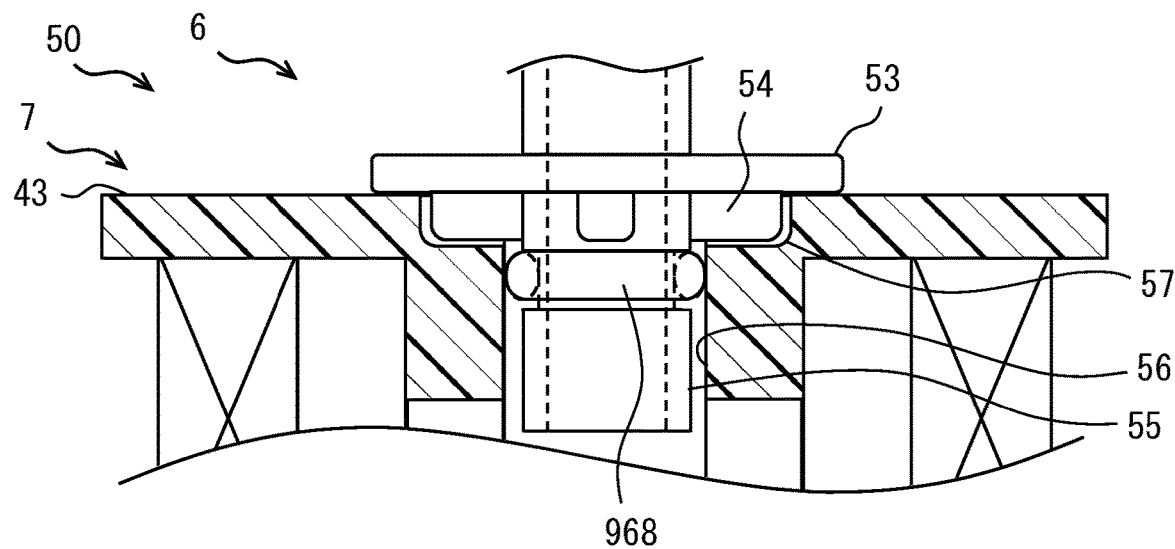
FIG. 20 is an enlarged cross-sectional view showing a passage connecting mechanism of a ninth embodiment.

In FIG. 20, a seal member 968 is arranged between the end pipe 55 and the center bore 56. The seal member 968 is supported by the end pipe 55. The seal member 968 comes in contact with both the end pipe 55 and the center bore 56 in an elastic manner. The seal member 968 provides an axial seal member. Moreover, the seal member 968 provides a contact type axial seal member.

Tenth Embodiment

This embodiment is a modification based on the preceding embodiments. In the above embodiments, the center bore 56 is a straight tubular shape along the axial direction AD. In addition to this, in this embodiment, the center bore 56 is provided with an enlarged portion on an upper portion. The shape of this embodiment is also available in other embodiments disclosed herein.

Figure 21:
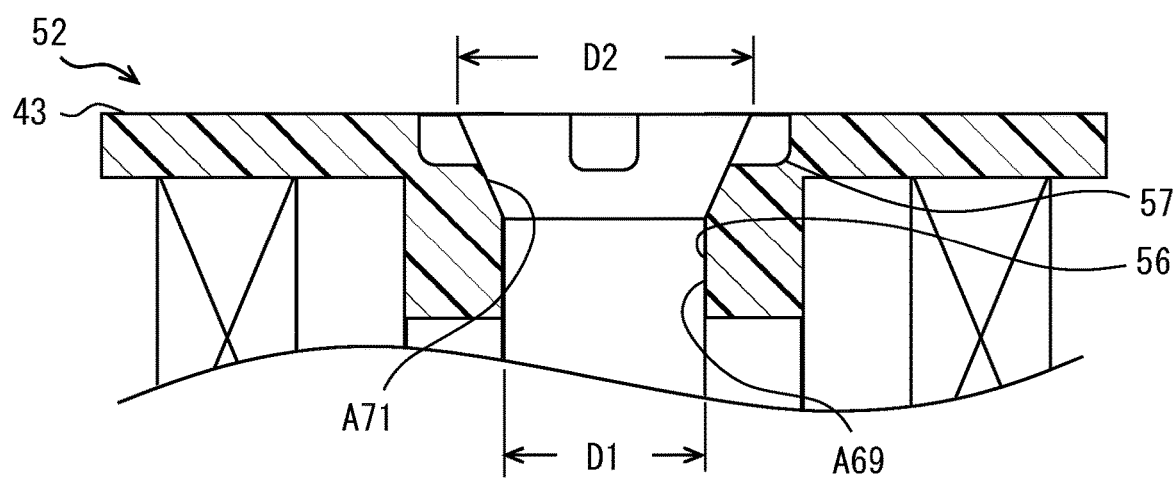
FIG. 21 is an enlarged cross-sectional view showing a passage connecting mechanism of a tenth embodiment.

In FIG. 21, the center bore 56 has a straight pipe portion A69. The straight pipe portion A69 is straight along the axial direction AD. Further, the center bore 56 has an enlarged portion A71. The enlarged portion A71 has a diameter that gradually increases toward an outside of the axial direction AD. The enlargement portion A71 is provided by a tapered surface that expands linearly. The enlarged portion A71 may be a curved surface. As a result, the center bore 56 has a diameter D1 at the straight pipe portion A69. The center bore 56 has a diameter D2 at the upper plate 43. The diameter D2 is larger than the diameter D1 (D1<D2). The center bore 56 facilitates the insertion of the end pipe 55.

Eleventh Embodiment

This embodiment is a modification based on the preceding embodiments. In the above embodiments, the plurality of ribs 16 define the virtual inner curved surface. Alternatively, a virtual outer curved surface may be used. The shape of this embodiment is also available in other embodiments disclosed herein.

Figure 22:
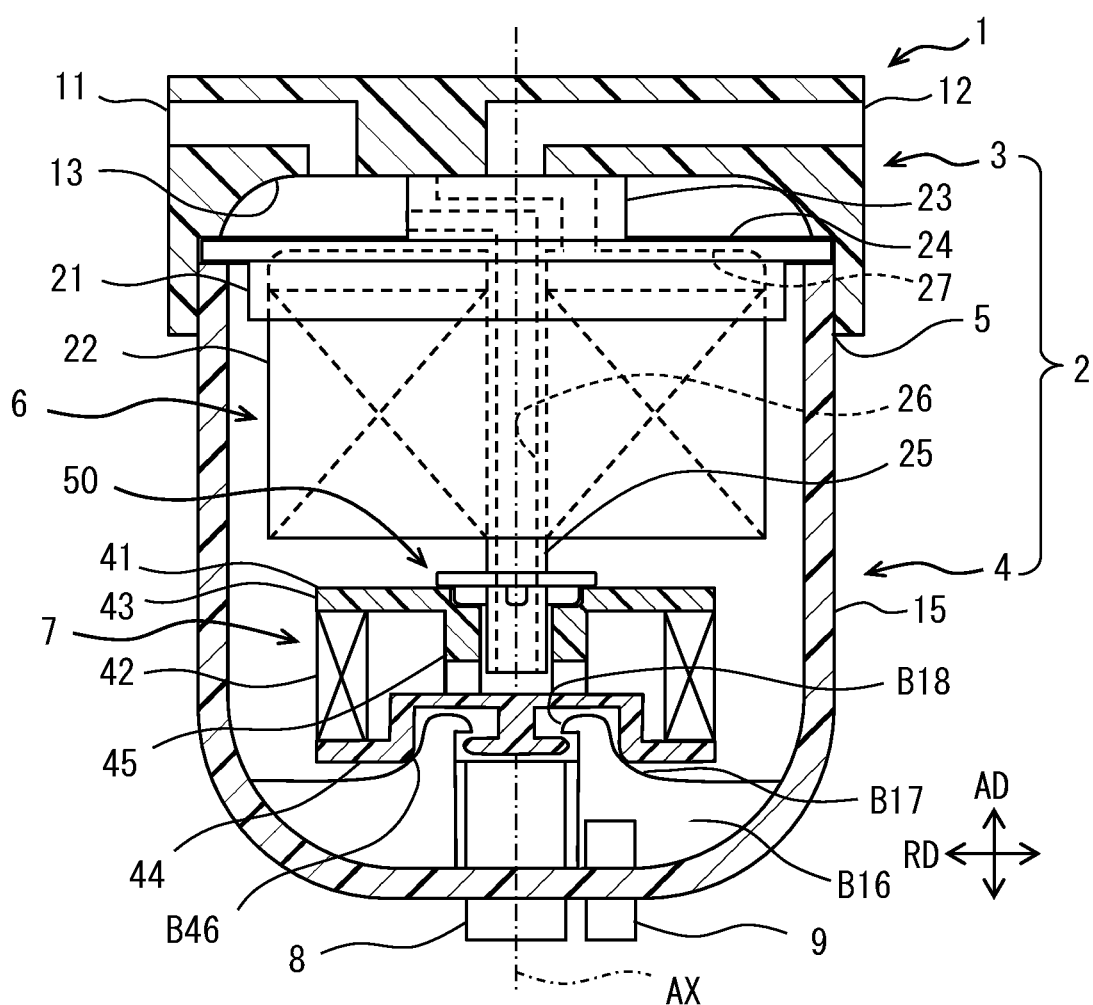
FIG. 22 is a cross-sectional view showing a filter device of an eleventh embodiment.

In FIG. 22, the body 15 has a plurality of ribs B16. The plurality of ribs B16 have a plurality of positioning surfaces B17. The plurality of ribs B16 defines a virtual curved surface on an outside thereof. The virtual curved surface is also an outer curved surface. The plurality of positioning surfaces B17 provide a part of the virtual curved surface. The curved surface has a radius R17. The virtual curved surface is an axisymmetric curved surface with the central axis AX as the axis of symmetry. The virtual curved surface is a convex curved surface toward the water separator 7. The plurality of ribs B16 include a plurality of holding pieces B18. The plurality of holding pieces B18 hold the water separator 7 to the second case 4. The water separator 7 has an edge B46 on an inside in the radial direction of the lower plate 44. The edge portion B46 can come into contact with a plurality of positioning surfaces B17.

Also in this embodiment, the plurality of ribs B16 position the water separator 7 in the movable range. The water separator 7 is movable within the movable range. The plurality of positioning surfaces B17 define a lower end of the movable range of the water separator 7 in the axial direction AD. The plurality of holding pieces B18 define an upper end of the movable range of the water separator 7 in the axial direction AD. The plurality of positioning surfaces B17 define a lower end of the movable range of the water separator 7 in the axial direction AD. In addition, the virtual outer surface provides the centering function. Also in this embodiment, the water separator 7 is movable in the axial direction AD and/or the radial direction RD. Therefore, an error may be tolerated.

Twelfth Embodiment

This embodiment is a modification based on the preceding embodiments. In the above embodiments, the centering function is provided by the virtual inner curved surface or the virtual outer curved surface. Alternatively, a configuration without the centering function may be also possible. The shape of this embodiment is also available in other embodiments disclosed herein.

Figure 23:
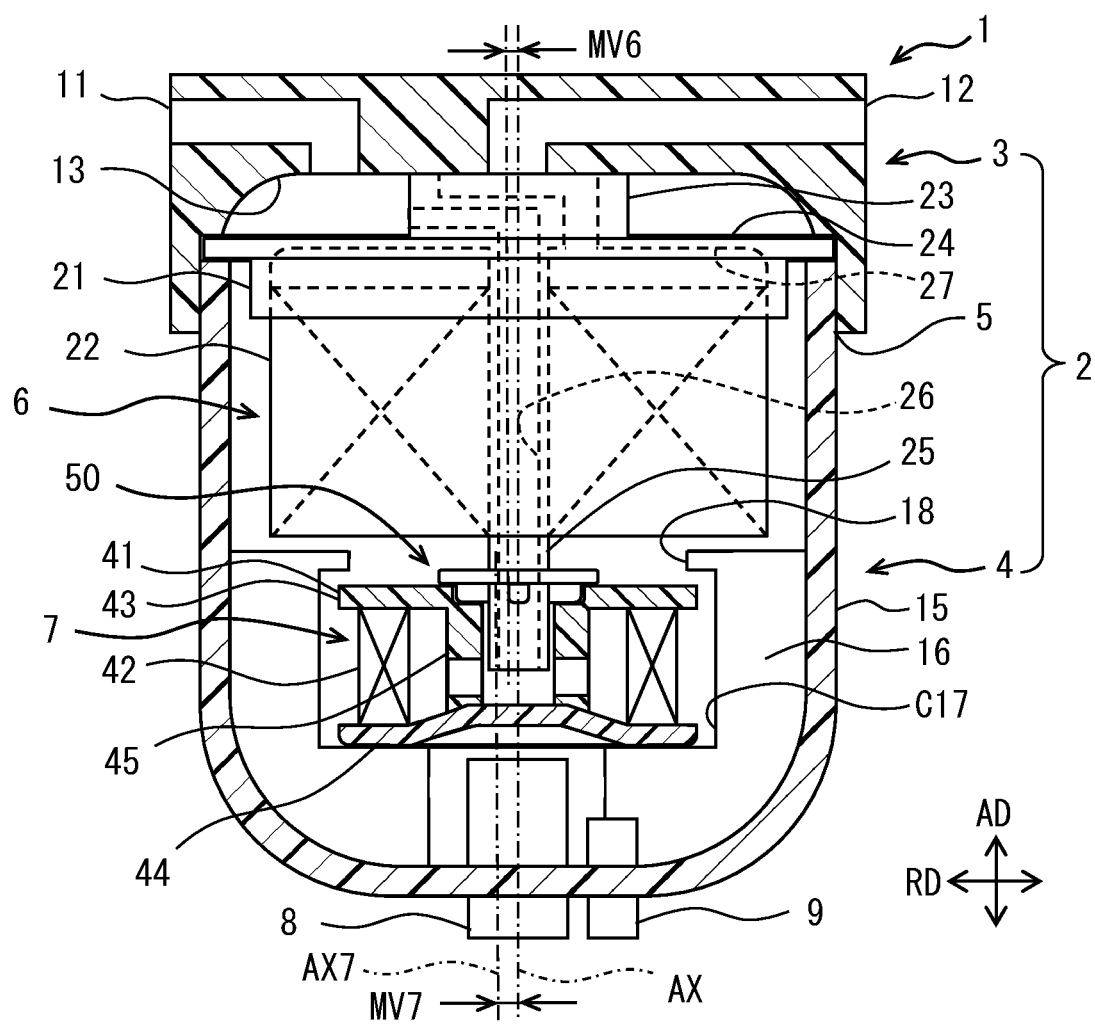
FIG. 23 is a cross-sectional view showing a filter device of a twelfth embodiment.

In FIG. 23, the plurality of ribs 16 have a plurality of positioning surfaces C17 which define a virtual cylindrical surface. The plurality of ribs 16 do not define any curved surface. Also in this embodiment, the plurality of ribs 16 divide the movable range. Bottom surfaces of the plurality of positioning surfaces C17 define a lower end of the movable range of the water separator 7 in the axial direction AD. The holding piece 18 define an upper end of the movable range of the water separator 7 in the axial direction AD. A side surface of the positioning surface C17 define a lower end of the movable range of the water separator 7 in the radial direction RD. Therefore, the water separator 7 can move in the axial direction AD and/or the radial direction RD. However, the centering function due to the curved surface cannot be obtained. Also in this embodiment, the movable distance MV6 and the movable distance MV7 are provided.

Thirteenth Embodiment

This embodiment is a modification based on the preceding embodiments. The filter device 1 may be provided in various shapes. The various shapes encourage users to select and use genuine products from legitimate manufacturers, for example, when replacing the element 6. This is because the genuine product enables smooth replacement work and can provide normal performance, whereas the non-genuine product requires difficult replacement work and may cause lowering in performance. From this point of view, it may be desirable that the filter device 1 is provided in various shapes in the preceding embodiments and the subsequent embodiments. This specification proposes various shapes of element 6 in one aspect. This specification proposes various shapes of the water separator 7 from another viewpoint. Due to the variety of shapes, it is expected that the genuine element 6 and the genuine water separator 7 are selected and used in the market.

Figure 24:
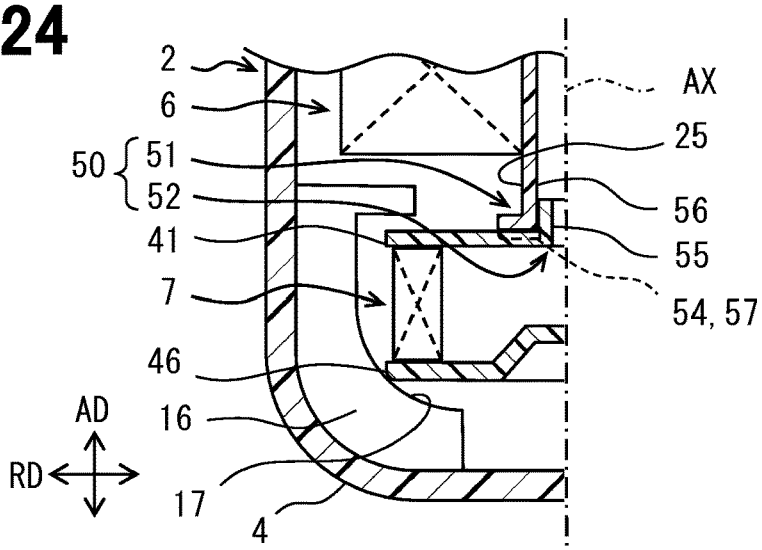
FIG. 24 is a cross-sectional view showing a filter device of a thirteenth embodiment.

In FIG. 24, in this embodiment, the element 6 and the water separator 7 include the passage connecting members 51 and 52 which form a fluid passage between them. The passage connecting members 51 and 52 connect the element 6 and the water separator 7 in a separable manner. The holding member 16 holds the water separator 7 with respect to the case 2 while allowing the water separator 7 to move within a movable range with respect to the case 2.

The element 6 includes the center bore 56 and the water separator 7 has the end pipe 55. The element 6 and the water separator 7 include the key protrusion 54 and the key groove 57. The end pipe 55 is inserted into the center bore 56 to engage the element 6 and the water separator 7 with respect to the radial direction RD. The key protrusion 54 is inserted into the key groove 57 to engage the element 6 and the water separator 7 with respect to the circumferential direction CD. The element 6 and the water separator 7 come into contact with each other in the axial direction AD, so that the water separator 7 is pushed by the element 6.

Fourteenth Embodiment

Figure 25:
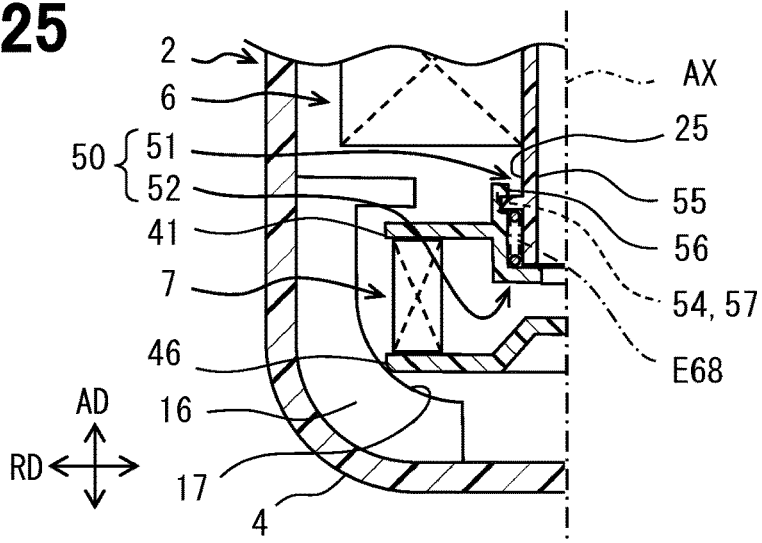
FIG. 25 is a cross-sectional view showing a filter device of a fourteenth embodiment.

This embodiment is a modification based on the preceding embodiments. In FIG. 25, in this embodiment, the element 6 includes the end pipe 55 and the water separator 7 includes the center bore 56. The elastic member E68 is arranged between the element 6 and the water separator 7. The elastic member E68 is a compression coil spring compressed with respect to the axial direction AD. The elastic member E68 can be provided by various elastic materials such as a metal spring, a resin spring, a leaf spring, and rubber. The elastic member E68 is connected to the element 6 or the water separator 7. In this embodiments, the element 6 and the water separator 7 are in contact with each other via the elastic member E68 in the axial direction AD in an indirect manner. The elastic member E68 enables a stable pushing force from the element 6 to the water separator 7. Also in this embodiment, the water separator 7 is pushed by the element 6 via the elastic member E68.

Fifteenth Embodiment

Figure 26:
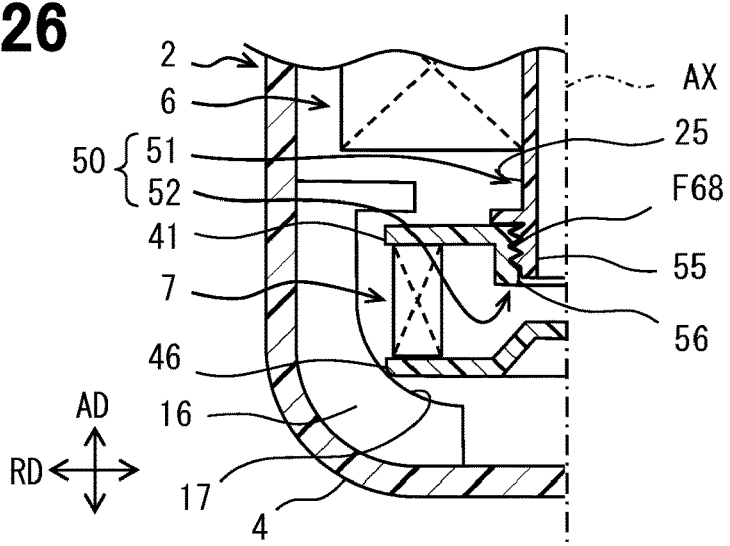
FIG. 26 is a cross-sectional view showing a filter device of a fifteenth embodiment.

This embodiment is a modification based on the preceding embodiments. In FIG. 26, in this embodiment, the element 6 and the water separator 7 are connected by a screw mechanism F68. The screw mechanism F68 is provided by a male threaded surface and a female threaded surface. The screw mechanism F68 is tightened to engage the element 6 and the water separator 7 with respect to the circumferential direction CD. The screw mechanism F68 provides a coupling member. As a result, the water separator 7 is adjusted toward the specific position both in the process of inserting the end pipe 55 into the center bore 56 and in the process of tightening the screw mechanism F68.

Sixteenth Embodiment

Figure 27:
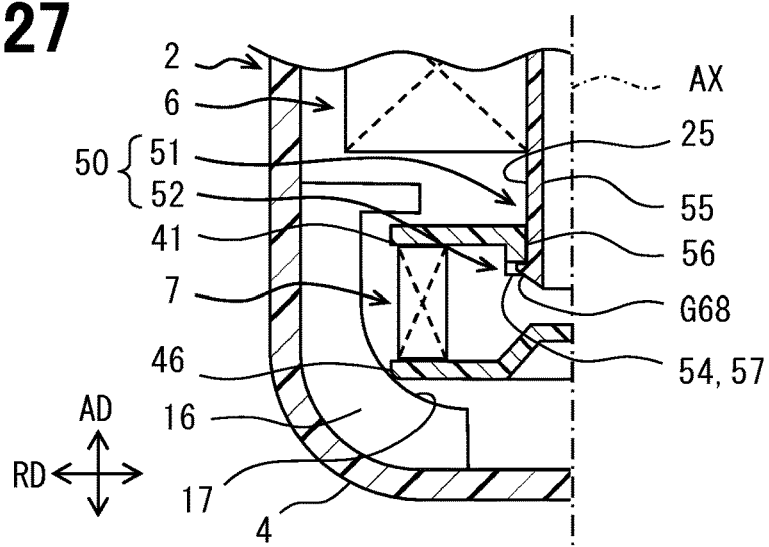
FIG. 27 is a cross-sectional view showing a filter device of a sixteenth embodiment.

This embodiment is a modification based on the preceding embodiments. In FIG. 27, in this embodiment, the element 6 and the water separator 7 are connected by a snap-fit mechanism G68. The snap-fit mechanism G68 is provided by a fitting of a concave portion and a convex portion with elastic deformation. The snap-fit mechanism G68 may perform a fitting operation from the separated state to the connected state and a releasing operation from the connected state to the separated state by elastically deforming the concave portion or the convex portion. The snap-fit mechanism G68 meshes the element 6 and the water separator 7 with respect to the circumferential direction CD in the connected state. The snap-fit mechanism G68 provides a coupling member. As a result, the water separator 7 is adjusted toward the specific position in the process of inserting the end pipe 55 into the center bore 56 and in the process of fitting the snap-fit mechanism G68.

Seventeenth Embodiment

Figure 28:
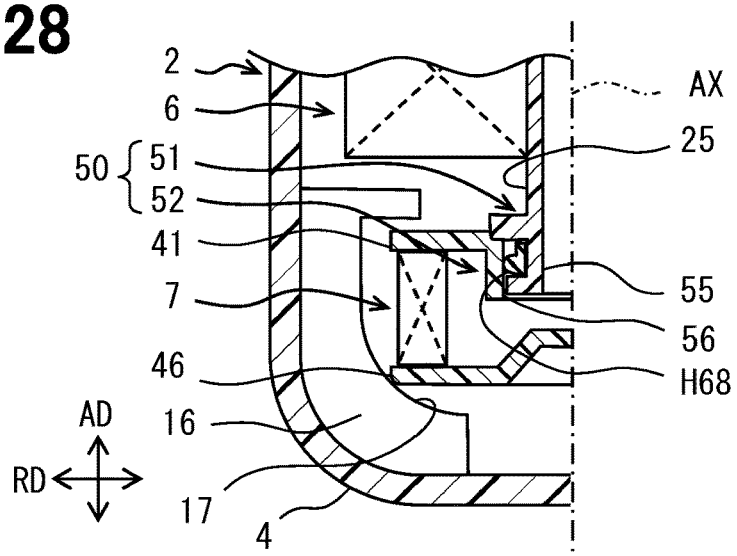
FIG. 28 is a cross-sectional view showing a filter device of a seventeenth embodiment.

This embodiment is a modification based on the preceding embodiments. In FIG. 28, in this embodiment, the element 6 and the water separator 7 are connected by a frictional force of a seal member H68. The seal member H68 is a lip seal member including a seal lip that comes into contact with the cylindrical surface of the end pipe 55 and the cylindrical surface of the center bore 56. The seal member H68 is strongly pushed against the cylindrical surface. The seal member H68 connects the element 6 and the water separator 7 with respect to the circumferential direction CD by a frictional force. The seal member H68 provides a coupling member. As a result, the water separator 7 is adjusted toward the specific position both in the process of inserting the end pipe 55 into the center bore 56 and in the process of pushing the seal member H68.

Eighteenth Embodiment

Figure 29:
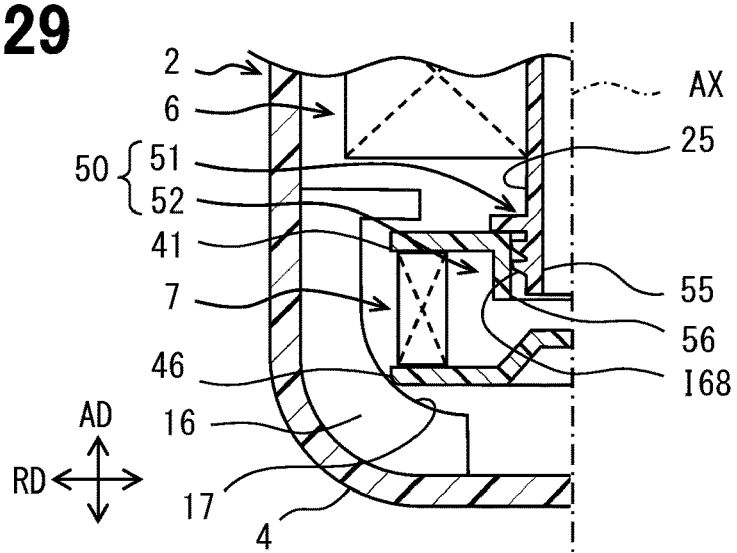
FIG. 29 is a cross-sectional view showing a filter device of an eighteenth embodiment.

This embodiment is a modification based on the preceding embodiments. In FIG. 29, in this embodiment, the element 6 and the water separator 7 are connected by a frictional force of a press-fit piece 168. The press-fit piece 168 is integrally formed on an outer peripheral cylindrical surface of the end pipe 55. The press-fit piece 168 generates a frictional force by coming into contact with the cylindrical surface of the center bore 56. The press-fit piece 168 is strongly pushed against the cylindrical surface. The press-fit piece 168 connects the element 6 and the water separator 7 with respect to the circumferential direction CD by a frictional force. The press-fit piece 168 provides a coupling member. As a result, the water separator 7 is adjusted toward the specific position both in the process of inserting the end pipe 55 into the center bore 56 and in the process of pushing the press-fit piece 168.

Nineteenth Embodiment

Figure 30:
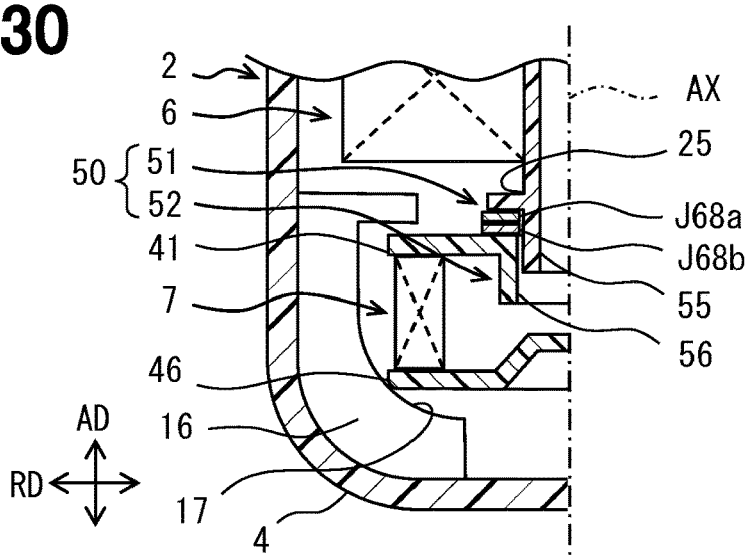
FIG. 30 is a cross-sectional view showing a filter device of a nineteenth embodiment.

This embodiment is a modification based on the preceding embodiments. In FIG. 30, in this embodiment, the element 6 and the water separator 7 are connected by a magnetic attraction force of a pair of magnetic pieces J68a and J68b. The magnetic pieces J68a and J68b are provided between the element 6 and the water separator 7. The magnetic pieces J68a and J68b may be provided by a permanent magnet and a permanent magnet, or a permanent magnet and a ferromagnetic member such as iron. The magnetic pieces J68a and J68b are arranged so as to magnetically bond the element 6 and the water separator 7 only at predetermined positions in the circumferential direction CD. The magnetic pieces J68a and J68b connect the element 6 and the water separator 7 with respect to the circumferential direction CD. The magnetic pieces J68a and J68b provide a coupling member. As a result, the water separator 7 is adjusted toward the specific position in the process of inserting the end pipe 55 into the center bore 56 and in the process of magnetically attracting the magnetic pieces J68a and J68b.

Twentieth Embodiment

Figure 31:
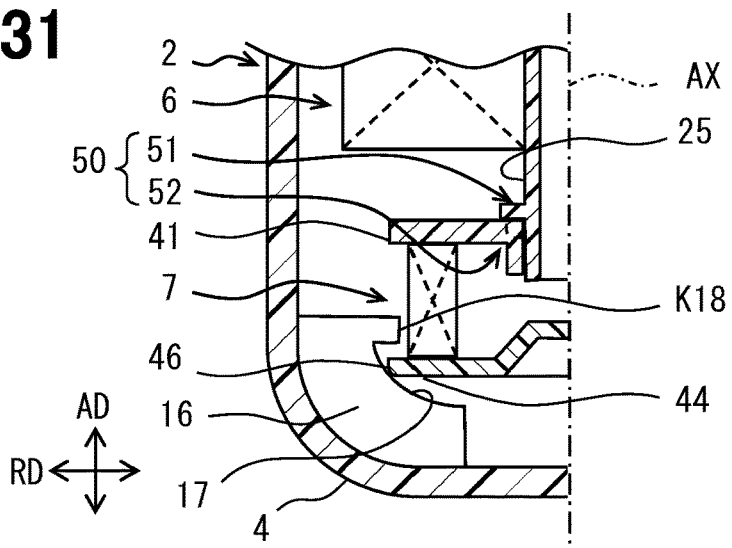
FIG. 31 is a cross-sectional view showing a filter device of a twentieth embodiment.

This embodiment is a modification based on the preceding embodiments. In the above embodiment, the holding pieces 18 and B18 hold the water separator 7 to the second case 4. Alternatively, in this embodiment, a holding piece K18 is adopted. In FIG. 31, the holding piece K18 locks an outer edge of the lower plate 44. As a result, the holding piece K18 holds the water separator 7 to the case 2 (the second case 4).

Twenty-First Embodiment

Figure 32:
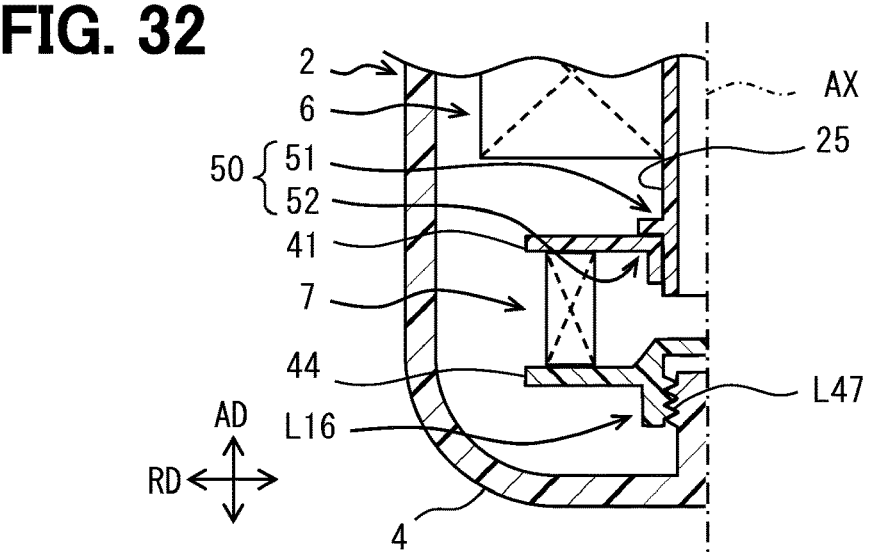
FIG. 32 is a cross-sectional view showing a filter device of a twenty-first embodiment.

This embodiment is a modification based on the preceding embodiments. In the above embodiments, the holding member 16 and B16 hold the water separator 7 to the second case 4. Alternatively, in this embodiment, a holding member L16 is adopted. In FIG. 32, the holding member L16 is provided by a screw mechanism L47. The screw mechanism L47 holds the water separator 7 to the case 2. The screw mechanism L47 has a relatively large amount of play. This play makes the water separator 7 movable within the movable range with respect to the case 2. The screw mechanism L47 includes a male screw member provided on the case 2 and a female screw member provided on the water separator 7.

Twenty-Second Embodiment

Figure 33:
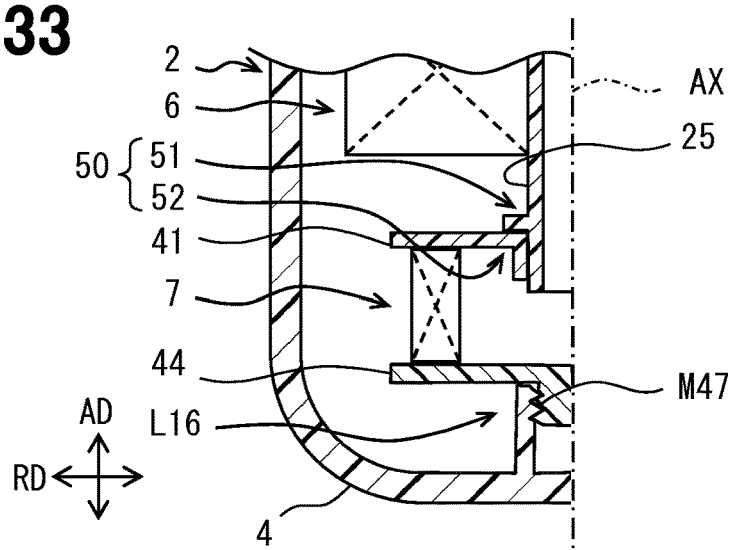
FIG. 33 is a cross-sectional view showing a filter device of a twenty-second embodiment.

This embodiment is a modification based on the preceding embodiments. In this embodiments, the screw mechanism L47 includes a male screw member provided on the case 2 and a female screw member provided on the water separator 7. Alternatively, in this embodiment, as shown in FIG. 33, the holding member L16 includes a female screw member provided on the case 2 and a male screw member provided on the water separator 7.

Thirty-Third Embodiment

Figure 34:
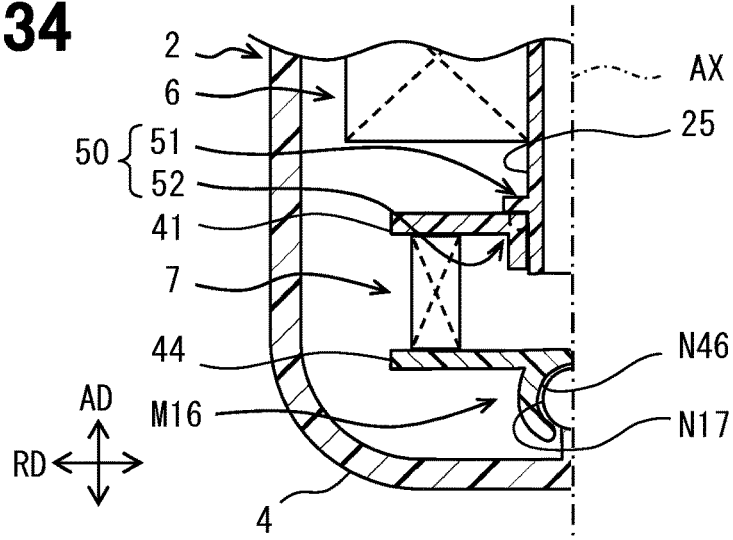
FIG. 34 is a cross-sectional view showing a filter device of a twenty-third embodiment.

This embodiment is a modification based on the preceding embodiments. In the above embodiments, the holding member 16, B16 and L16 hold the water separator 7 to the second case 4. Alternatively, in this embodiment, a universal joint M16 is adopted. In FIG. 34, the universal joint M16 holds the water separator 7 to the case 4. The universal joint M16 includes a ball N17 provided in the case 4 and a cover N46 provided in the water separator 7. The cover N46 provides a wall portion which wraps the ball N17. A curved surface on an outer surface of the ball N17 and a curved surface on an inner surface of the cover N46 provide a positioning surface. The ball N17 also serves as a holding piece 18. The universal joint M16 provides a holding member.

Twenty-Fourth Embodiment

Figure 35:
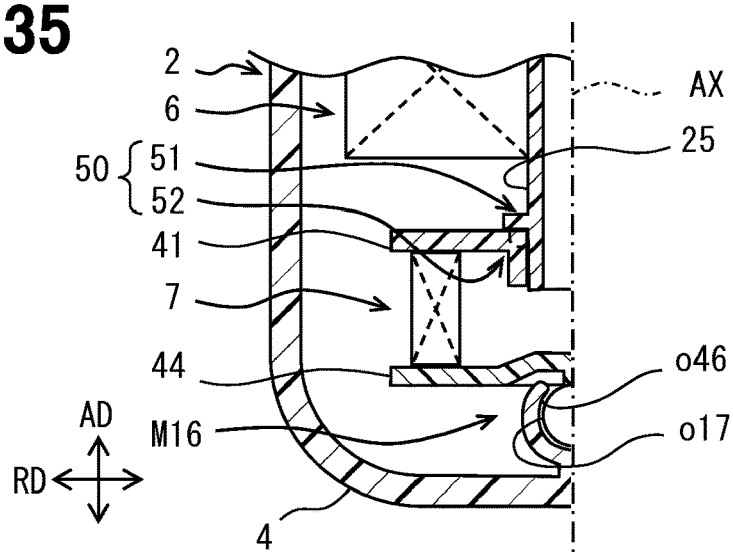
FIG. 35 is a cross-sectional view showing a filter device of a twenty-fourth embodiment.

This embodiment is a modification based on the preceding embodiments. The universal joint M16 includes the ball N17 provided in the case 4 and the cover N46 provided in the water separator 7. Alternatively, in this embodiment, as illustrated in FIG. 35, the universal joint M16 includes a ball o17 provided in the water separator 7 and a cover o46 provided in the case 4. The cover o46 provides a wall portion which wraps the ball o17. A curved surface on an outer surface of the ball o17 and a curved surface on an inner surface of the cover o46 provide a positioning surface.

Twenty-Fifth Embodiment

This embodiment is a modification based on the preceding embodiments. In the above embodiments, the water separator 7 is held with respect to the case 4 in a rotatable manner. Alternatively, the water separator 7 may mesh with the case 4 at a predetermined position in the circumferential direction CD.

Figure 36:
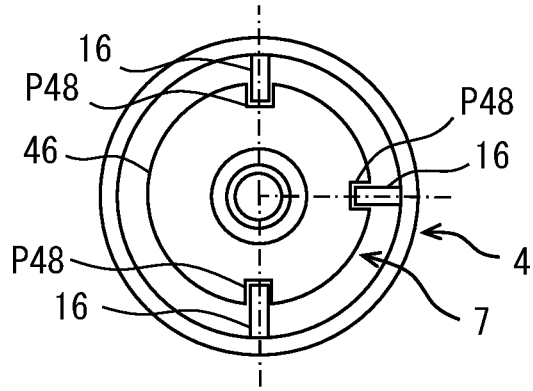
FIG. 36 is a cross-sectional view showing a filter device of a twenty-fifth embodiment.

As illustrated in FIG. 36, the water separator 7 is held in the case 4. The case 4 has a plurality of ribs 16. Three ribs 16 are provided, for example, at angular intervals of 90 degrees-90 degrees-180 degrees. The water separator 7 has a plurality of grooves P48 at the edge 46. Three grooves P48 are provided, for example, at angular intervals of 90 degrees-90 degrees-180 degrees. The plurality of ribs 16 and the plurality of grooves P48 are provided at angular intervals corresponding to each other. As a result, the plurality of ribs 16 and the plurality of grooves P48 mesh with each other only at a predetermined position in the circumferential direction CD. As a result, the water separator 7, which may be suitable with the case 4, may be identified by the plurality of ribs 16 and the plurality of grooves P48. According to this embodiment, it is expected that a genuine water separator 7 compatible with the plurality of ribs 16 is selected and used.

Twenty-Sixth Embodiment

Figure 37:
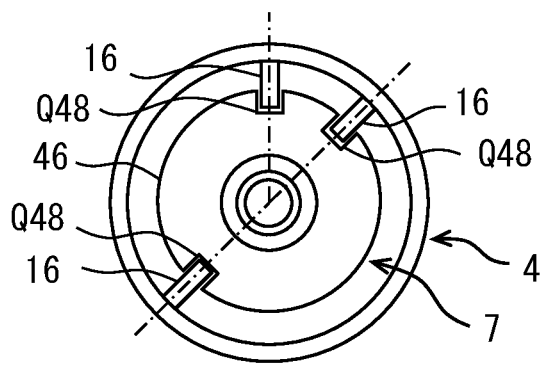
FIG. 37 is a cross-sectional view showing a filter device of a twenty-sixth embodiment.

This embodiment is a modification based on the preceding embodiments. In the above embodiments, three ribs 16 and three grooves P48 are provided at angular intervals of 90 degrees-90 degrees-180 degrees. Alternatively, the plurality of ribs 16 and the plurality of grooves may be arranged at various positions. In FIG. 37, three ribs 16 may be provided, for example, at angular intervals of 45 degrees-180 degrees-135 degrees. Three grooves Q48 are provided, for example, at angular intervals of 45 degrees-180 degrees-135 degrees. All intervals are not equal. According to this embodiment, it is expected that a genuine water separator 7 compatible with the plurality of ribs 16 is selected and used.

Twenty-Seventh Embodiment

This embodiment is a modification based on the preceding embodiments. In the above embodiment, the center block 23 of the element 6 comes in contact with the inner surface of the first case 3. Alternatively, the first case 3 and the element 6 may mesh with each other at least with respect to the radial direction RD.

Figure 38:
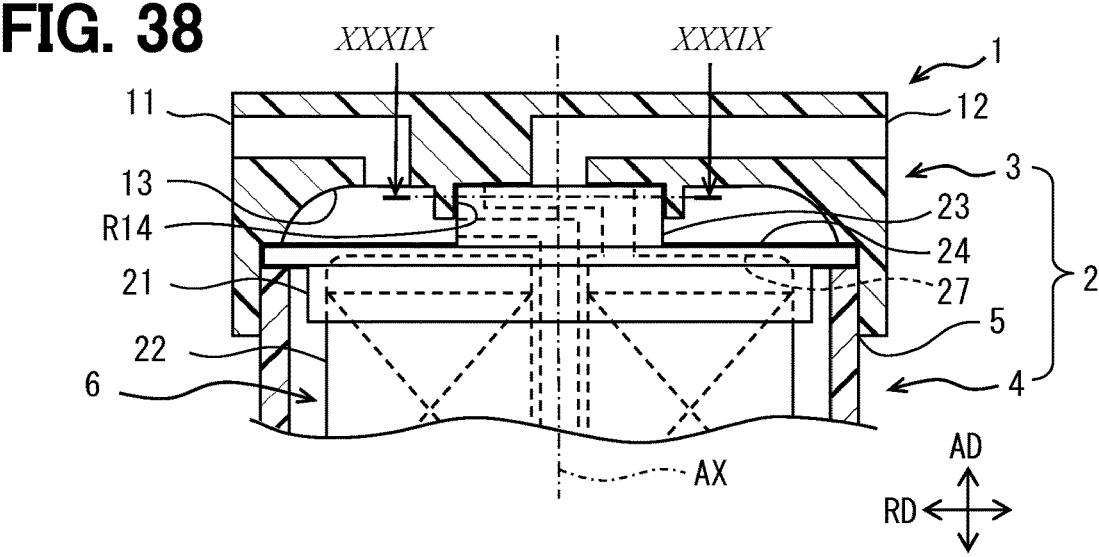
FIG. 38 is a cross-sectional view showing a filter device of a twenty-seventh embodiment.

In FIG. 38, the first case 3 has a fitting portion R14 at a portion facing the element 6. The fitting portion R14 defines a concave fitting chamber. The fitting portion R14 is provided by an annular cylindrical wall. The fitting portion R14 can accept a convex center block 23.

Figure 39:
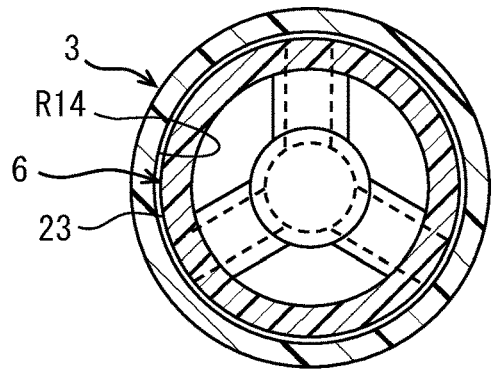
FIG. 39 is a cross sectional view on a line XXXIX-XXXIX in FIG. 38.

In FIG. 39, a fitting chamber defined by the fitting portion R14 is circular in a cross section orthogonal to the central axis AX. The center block 23 is circular in a cross section orthogonal to the central axis AX. The fitting portion R14 and the center block 23 mesh with each other with respect to the radial direction RD. The fitting portion R14 may be formed in a convex shape on the inner surface of the case 3. In this case, the center block 23 may be formed in a concave shape. According to this embodiment, it is expected that a genuine element 6 suitable for the fitting portion R14 is selected and used by the engagement between the case 3 and the element 6.

Twenty-Eighth Embodiment

This embodiment is a modification based on the preceding embodiments. In the above embodiments, the shape of the fitting portion R14 and the shape of the center block 23 are circular. Alternatively, the first case 3 and the element 6 may mesh with each other with respect to the circumferential direction CD.

Figure 40:
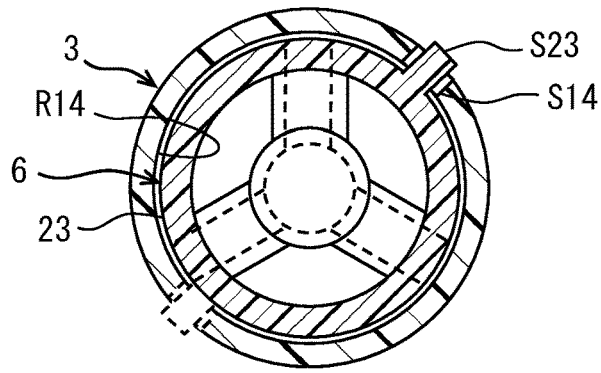
FIG. 40 is a cross sectional view showing an engaging portion of a twenty-eighth embodiment.

In FIG. 40, the fitting portion R14 and the center block 23 have meshing portions S14 and S23 which mesh with each other with respect to the circumferential direction CD. The meshing portion S14 is provided by a recess extending in the radial direction from an inner surface of the fitting portion R14. The meshing portion S23 is provided by a convex portion extending radially outward from the center block 23. The meshing portions S14 and S23 may be provided in one set as shown by a solid line, or may be provided in a plurality of sets as shown by a broken line. The meshing portions S14 and S23 provide meshing at one or a plurality of points in the circumferential direction CD. The number of meshing portions S14 and S23, or the relative positional relationship between the plurality of meshing portions S14 and S23 may be set in various ways. As a result, a large number of regular combinations of the first case 3 and the element 6 may be set. As a result, the fitting portion R14 and the center block 23 mesh with each other only at a predetermined angular position in the circumferential direction CD. Therefore, even in this embodiment, it is expected that the genuine element 6 is selected and used.

Twenty-Ninth Embodiment

Figure 41:
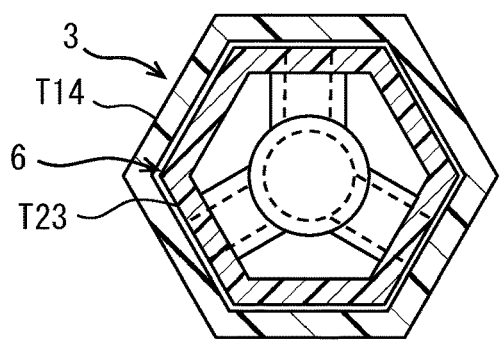
FIG. 41 is a cross sectional view showing an engaging portion of a twenty-ninth embodiment.

This embodiment is a modification based on the preceding embodiments. In the above embodiment, the shape of the fitting portion R14 and the shape of the center block 23 are circular. Alternatively, in this embodiment, as shown in FIG. 41, a polygonal fitting portion T14 and a polygonal center block T23 are adopted. The fitting portion T14 and the center block T23 are hexagonal. The center block T23 meshes in a non-rotatable manner within the fitting portion T14. In addition, the same meshing portion as in the preceding embodiments may be provided. Also in this embodiment, the same effects as those of the preceding embodiments may be obtained.

Thirtieth Embodiment

This embodiment is a modification based on the preceding embodiments. In the above embodiment, the distal end of the center pipe 25 is supported in the water separator 7. Alternatively, the distal end of the center pipe 25 may be connected to the second case 4.

Figure 42:
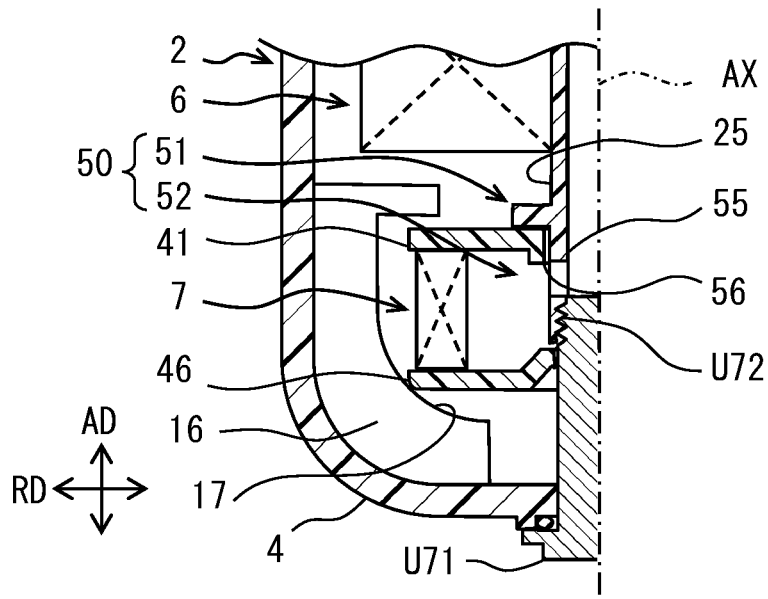
FIG. 42 is a cross-sectional view showing a filter device of a thirtieth embodiment.

In FIG. 42, the second case 4 has a drain bolt U71. The drain bolt U71 is a bolt for opening and closing a drain hole of the second case 4. The drain bolt U71 is arranged on the central axis AX. The drain bolt U71 extends toward the inside of the second case 4. The drain bolt U71 reaches the inside of the water separator 7. The drain bolt U71 is connected to the distal end of the center pipe 25. The drain bolt U71 and the center pipe 25 are connected by a screw mechanism U72. The drain bolt U71 and the center pipe 25 are connected at the inside of the water separator 7. According to this embodiment, since the drain bolt U71 fixes the element 6, the fastening strength in the filter device 1 may be improved.

Thirty-First Embodiment

Figure 43:
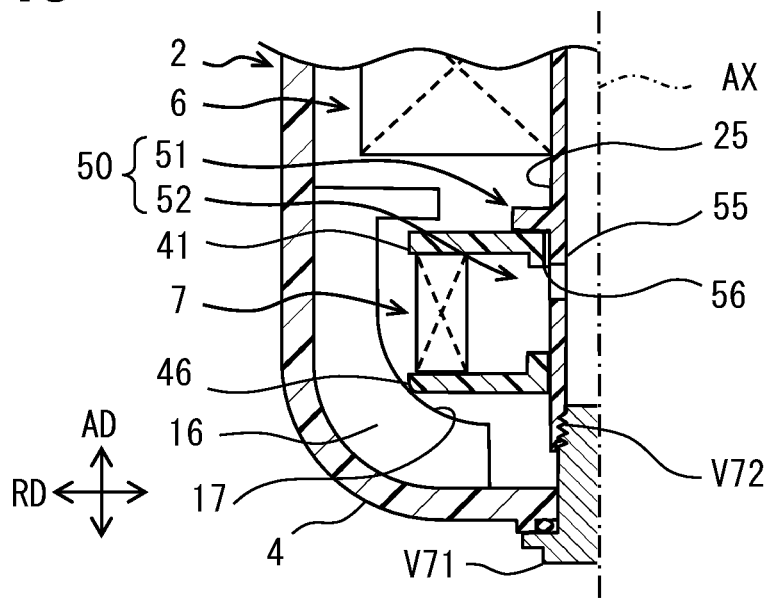
FIG. 43 is a cross-sectional view showing a filter device of a thirty-first embodiment.

This embodiment is a modification based on the preceding embodiments. In the above embodiment, the distal end of the center pipe 25 is positioned in the water separator 7. Alternatively, the distal end of the center pipe 25 may penetrate the water separator 7. In FIG. 43, the center pipe 25 penetrates the water separator 7. The drain bolt V71 and the center pipe 25 are connected by a screw mechanism V72 on an outside of the water separator 7, in other words, on a lower side.

Thirty-Second Embodiment

This embodiment is a modification based on the preceding embodiments. In the above embodiments, the mechanical shape encourages the use of the genuine element 6 and/or the genuine water separator 7. Alternatively, an electrical control device may be used.

Figure 44:
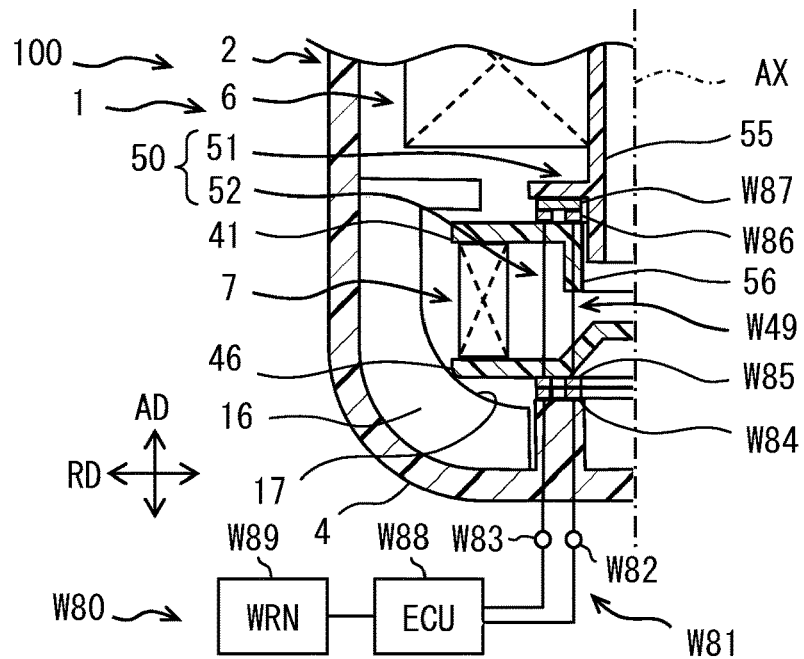
FIG. 44 is a cross-sectional view showing a filter device of a thirty-second embodiment.

In FIG. 44, the filter system 100 includes a filter device 1 and a control system W80. The filter device 1 includes the passage connecting portions 51 and 52 and the holding member 16 as in the first embodiment. The filter device 1 may have the same configuration as other embodiments. In this embodiment, the second case 4, the element 6, and the water separator 7 include an electrical circuit W81 which is indicative of a genuine product. The electric circuit W81 outputs an electric signal by assembling the genuine element 6 and the genuine water separator 7 into the genuine second case 4. In the illustrated example, the signal is provided by an electrical conduct of the electrical circuit W81. The electric circuit W81 is also called a detection circuit. The control system W80 detects the use of the genuine element 6 by the above signal. The control system W80 detects the use of the genuine water separator 7 by the above signal. Further, the control system W80 allows a normal use of the system equipped with the filter device 1 such as starting the vehicle, starting the internal combustion engine, turning off the warning lamp, and the like in response to the above signal.

The filter device 1 includes a pair of terminals W82 and W83 for the electric circuit W81. The electric circuit W81 includes a pair of electrodes W84 fixed to the second case 4. The electric circuit W81 includes a pair of electrodes W85 fixed to the water separator 7 and a pair of electrodes W86 fixed to the water separator 7. The pair of electrodes W85 and the pair of electrodes W86 are connected by a pair of conductive members. The pair of electrodes W85 and the pair of electrodes W86 are a part of an embedded circuit W49 embedded in the water separator 7. Therefore, the water separator 7 includes a member (the embedded circuit W49) for notifying the outside of the second case 4 of an existence or non-existence of the water separator 7. In other words, the water separator 7 includes a member (the embedded circuit W49) for detecting a presence or absence of the water separator 7 from the outside of the second case 4. The pair of electrodes W85 are fixed at positions that are electrically conductive with the pair of electrodes W84. Further, the electric circuit W81 includes an electrode W87 fixed to the element 6. The electrode 87 is fixed to the element 6 so as to short-circuit the pair of electrodes W86. The electrode W87 is a part of the embedded circuit embedded in the element 6. Therefore, the element 6 includes a member (the electrode W87) for notifying the outside of the second case 4 of a presence or absence of the element 6. In other words, the element 6 includes a member (the electrode W87) for detecting the presence or absence of the element 6 from the outside of the second case 4. The control system W80 includes a control circuit W88 (ECU) connected to the electric circuit W81 and a warning device W89 (WRN).

The control circuit W88 turns on (activates) the warning device W89 in response to that the electric circuit W81 is in a conductive state, and turns off (deactivates) the warning device W89 in response to that the electric circuit W81 is in a non-conducting state. The control circuit W88 may allow the use of the system when the electric circuit W81 is in the conductive state, and may prohibit the use of the system when the electric circuit W81 is in the non-conducting state. The control circuit W88 may be provided by a sequence circuit composed of only hardware. Alternatively, the control circuit W88 may be provided by a microcomputer circuit comprising a processor and a memory storing software. An algorithm of the control circuit W88 may be provided by processing in response to the signal of the electric circuit W81.

Figure 45:
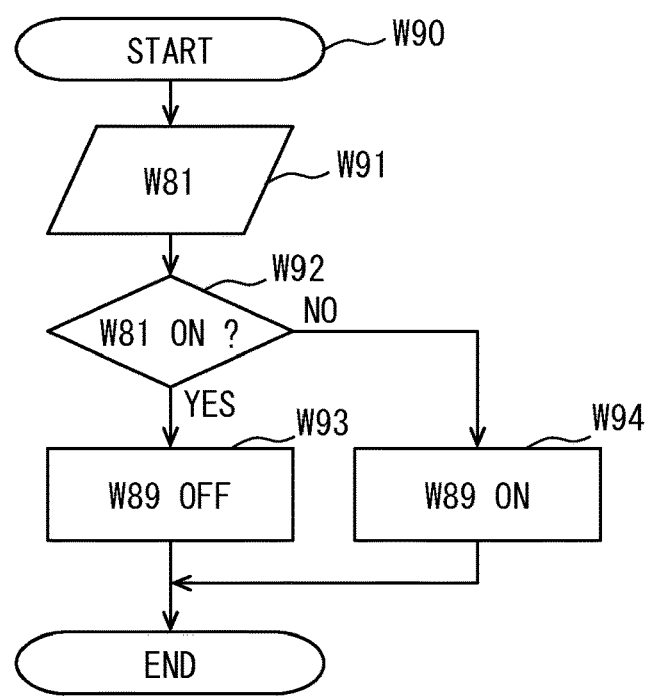
FIG. 45 is a flowchart showing a control process.

FIG. 45 shows the control process W90 in the control circuit W88. The control circuit W88 monitors an electrical state of the electric circuit W81 in step W91. In step W91, it inputs the conductive state (ON) of the electric circuit W81 or the non-conductive state (OFF) of the electric circuit W81. The control circuit W88 determines in step W92 whether or not the electric circuit W81 is in the conductive state (ON). If the determination in step W92 is affirmative, the process proceeds to step W93. The control circuit W88 turns off the warning device W89 in step W93. If the determination in step W92 is not affirmative, the process proceeds to step W94. The control circuit W88 turns on the warning device W89 in step W94.

According to this embodiment, it is possible to provide a filter device and a method for manufacturing the filter device in which the element 6 for solid removal can be replaced while leaving the water separator 7 in the second case 4. Further, according to this embodiment, the use of the genuine product may be known from an outside of the second case 4. Also in this embodiment, it is expected that the genuine element 6 and the genuine water separator 7 are selected and used.

Other Embodiments

The disclosure in this specification, the drawings, and the like is not limited to the illustrated embodiments. The disclosure encompasses the illustrated embodiments and variations thereof by those skilled in the art. For example, the present disclosure is not limited to the combinations of components and/or elements shown in the embodiments. The present disclosure may be implemented in various combinations. The present disclosure may have additional members which may be added to the embodiments. The present disclosure encompasses omission of the components and/or elements of the embodiments. The present disclosure encompasses the replacement or combination of components and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

The disclosure in the specification, drawings and the like is not limited by the description of the claims. The disclosures in the specification, the drawings, and the like encompass the technical ideas described in the claims, and further extend to a wider variety of technical ideas than those in the claims. Therefore, various technical ideas can be extracted from the disclosure of the specification, the drawings and the like without being limited to the description of the claims.

In the above embodiments, the centering function is provided by the positioning surfaces 17 and B17 which are curved surfaces. Alternatively, the positioning surface may be a slope. Therefore, the positioning surfaces 17 and B17 are slopes or curved surfaces having the central axis AX4 of the case 2 as the rotation axis. Even in these cases, the positioning surface guides the central axis AX7 of the water separator 7 toward the central axis AX4 of the second case 4 by contact with the water separator 7. Further, the positioning surface urges the water separator 7 by pushing the water separator 7 through the element 6.

In the above embodiments, the passage connecting mechanism 50 is provided by the passage connecting member 51 belonging to the element 6 and the passage connecting member 52 belonging to the water separator 7. Alternatively, the passage connecting mechanism 50 may be provided in a variety of configurations. The passage connecting mechanism 50 is provided by the passage connecting member 52 belonging to the element 6 and the passage connecting member 51 belonging to the water separator 7. Further, the passage connecting member 51 may have the end pipe 55 and the key groove 57. In this case, the passage connecting member 52 has a center bore 56 and a key protrusion 54. Therefore, the passage connecting members 51 and 52 may have the end pipe 55 provided on either one of the element 6 and the water separator 7, the center bore 56 provided on the other one, the key protrusion 54 provided on either one of the element 6 and the water separator 7, and the key groove 57 provided on the other one. The end pipe 55 is inserted into the center bore 56 to engage the element 6 and the water separator 7 with respect to the radial direction RD. The key protrusion 54 is inserted into the key groove 57 to engage the element 6 and the water separator 7 with respect to the circumferential direction CD. The element 6 and the water separator 7 come in contact with the axial direction AD, so that the water separator 7 is pushed by the element 6.

In the above embodiments, the water separator 7 includes a coalescing member 42 which separates and submerges as sediment by coalescing water content. Alternatively, the water separator 7 may include a water repellent member which separates and submerges as sediment by repelling water. For example, a water repellent film, a water repellent treated non-woven fabric, or the like may be used as the water repellent member.

What is claimed is:

1. A filter device, comprising:
a case which provides a fluid passage;
an element which is accommodated in the case and filters fluid in the fluid passage;
a water separator which is accommodated in the case and separates water from the fluid;
passage connecting members which form a fluid passage between the element and the water separator, and separably connect the element and the water separator;
a holding member which holds the water separator with respect to the case while making the water separator movable with respect to the case; and
a support member which movably supports the element by a movable distance in a radial direction, wherein
a movable distance of the water separator in the radial direction is set to be larger than the movable distance of the element, and
the holding member has a positioning surface which guides a central axis of the water separator toward a central axis of the case by coming into contact with the water separator.

2. A filter device, comprising:
a case which provides a fluid passage;
an element which is accommodated in the case and filters fluid in the fluid passage;
a water separator which is accommodated in the case and separates water from the fluid;
passage connecting members which form a fluid passage between the element and the water separator, and separably connect the element and the water separator;
a holding member which holds the water separator with respect to the case while making the water separator movable with respect to the case; and
a support member which movably supports the element by a movable distance in a radial direction, wherein
a movable distance of the water separator in the radial direction is set to be larger than the movable distance of the element, and
the positioning surface is a slope or a curved surface having a central axis of the case as a rotation axis.

3. A filter device, comprising:
a case which provides a fluid passage;
an element which is accommodated in the case and filters fluid in the fluid passage;
a water separator which is accommodated in the case and separates water from the fluid;
passage connecting members which form a fluid passage between the element and the water separator, and separably connect the element and the water separator;

a holding member which holds the water separator with respect to the case while making the water separator movable with respect to the case; and a support member which movably supports the element by a movable distance in a radial direction, wherein a movable distance of the water separator in the radial direction is set to be larger than the movable distance of the element, and the passage connecting member includes:

an end pipe provided on either one of the element and the water separator, and a center bore provided on the other one; and a coupling member provided between the element and the water separator, and wherein the end pipe engages the element and the water separator in the radial direction by being inserted into the center bore, and wherein the connecting member connects the element and the water separator so as to move together with respect to a circumferential direction, and wherein the element and the water separator come into contact directly or indirectly with each other in an axial direction, and the water separator is pushed by the element.

\* \* \* \* \*